US012812669B2

(12) United States Patent
Yamamoto et al.

(10) Patent No.: US 12,812,669 B2
(45) **Date of Patent: *Nov. 24, 2026**

(54) MANAGEMENT DEVICE, COMMUNICATION SYSTEM, VEHICLE, VEHICLE COMMUNICATION MANAGEMENT METHOD, AND VEHICLE COMMUNICATION MANAGEMENT PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Yusuke Yamamoto, Osaka (JP); Hideyuki Tanaka, Osaka (JP); Tatsuya Izumi, Osaka (JP); Junji Yano, Osaka (JP); Yasuhiro Yabuuchi, Yokkaichi (JP); Tadashi Matsumoto, Yokkaichi (JP); Takeshi Hagihara, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 220 days.

This patent is subject to a terminal disclaimer.

(21) Appl. No.: 18/772,798

(22) Filed: Jul. 15, 2024

(65) Prior Publication Data

US 2024/0373455 A1 Nov. 7, 2024

Related U.S. Application Data

(63) Continuation of application No. 17/436,702, filed as application No. PCT/JP2019/041025 on Oct. 18, 2019, now Pat. No. 12,075,463.

(30) Foreign Application Priority Data

Mar. 5, 2019 (JP) ................................ 2019-039558

(51) Int. Cl.

*H04W 24/02* (2009.01)
*H04W 4/40* (2018.01)
*H04W 74/00* (2009.01)

(52) U.S. Cl.

CPC ........... *H04W 74/002* (2013.01); *H04W 4/40* (2018.02); *H04W 24/02* (2013.01)

(58) Field of Classification Search

CPC ..... H04W 74/002; H04W 4/40; H04W 24/02; H04W 84/005; H04L 41/0806;

(Continued)

(56) References Cited

U.S. PATENT DOCUMENTS 8,751,649 B2 6/2014 Villait et al.
9,432,260 B2 8/2016 Wang et al.

(Continued)

FOREIGN PATENT DOCUMENTS

JP 2003-218928 A 7/2003
JP 2011-014033 A 1/2011

(Continued)

OTHER PUBLICATIONS

Apr. 15, 2025 Office Action issued in U.S. Appl. No. 18/596,981.

(Continued)

*Primary Examiner* — Lan-Huong Truong
(74) *Attorney, Agent, or Firm* — Oliff PLC

(57) ABSTRACT

A management device includes: a detection unit configured to detect addition of a function unit to a network including one or a plurality of on-vehicle function units; a generation unit configured to acquire function unit information of a new function unit that is detected, and function unit information (Continued)

of the on-vehicle function unit, and configured to generate configuration information of a new network that is the network in which the new function unit is further included; and an acquisition unit configured to acquire feasibility information indicating feasibility of the new network and corresponding to the configuration information generated by the generation unit. When the feasibility information corresponding to the configuration information generated by the generation unit is not present in a database, the acquisition unit transmits the configuration information generated by the generation unit in order to verify the feasibility of the configuration information.

14 Claims, 17 Drawing Sheets

(58) Field of Classification Search
CPC ... H04L 41/0816; H04L 41/082; H04L 67/12; H04L 12/28
See application file for complete search history.

(56) References Cited

U.S. PATENT DOCUMENTS

| | | | | |
|---|---|---|---|---|
| 11,956,314 | B2 | 4/2024 | Yamamoto et al. | |
| 2005/0004726 | A1 | 1/2005 | Paquet | |
| 2013/0090820 | A1 | 4/2013 | Frashure et al. | |
| 2013/0091534 | A1 | 4/2013 | Gilde et al. | |
| 2013/0230124 | A1 | 9/2013 | Chini et al. | |
| 2013/0294453 | A1 | 11/2013 | Han et al. | |
| 2014/0280809 | A1 | 9/2014 | Li et al. | |
| 2014/0337829 | A1 | 11/2014 | Ito | |
| 2016/0065298 | A1 | 3/2016 | Nakagawa et al. | |
| 2016/0301577 | A1 | 10/2016 | Lane | |
| 2017/0033986 | A1 | 2/2017 | Anderson et al. | |
| 2017/0048158 | A1* | 2/2017 | Park | H04L 47/72 |
| 2017/0093866 | A1* | 3/2017 | Ben-Noon | H04W 12/068 |
| 2018/0351791 | A1 | 12/2018 | Nagarajan et al. | |
| 2019/0342989 | A1* | 11/2019 | Toyama | H05K 1/0216 |
| 2020/0382446 | A1 | 12/2020 | Jung | |
| 2021/0261096 | A1 | 8/2021 | Kabany | |
| 2021/0397433 | A1 | 12/2021 | Itatsu | |
| 2021/0400452 | A1 | 12/2021 | Baba et al. | |
| 2023/0142079 | A1 | 5/2023 | Iwata et al. | |
| 2024/0223660 | A1 | 7/2024 | Yamamoto et al. | |

FOREIGN PATENT DOCUMENTS

| | | | | |
|---|---|---|---|---|
| JP | 2017-220220 | A | 12/2017 | |
| JP | 2018-192876 | A | 12/2018 | |
| WO | WO-2019230098 | A1 * | 12/2019 | G01C 21/3811 |
| WO | WO-2020162343 | A1 * | 8/2020 | G08G 1/22 |

OTHER PUBLICATIONS

Dec. 20, 2024 Office Action issued in U.S. Appl. No. 18/596,981.

Sep. 30, 2025 Notice of Allowance issued in U.S. Appl. No. 18/596,981.

PCT/JP2019/041016 International Patent Application filed on Oct. 18, 2019.

U.S. Appl. No. 17/437,027, filed Sep. 7, 2021 in the name of Yusuke Yamamoto et al.

Translated Drawings from International Patent Application No. PCT/JP2019/041016 filed on Oct. 18, 2019.

Jun. 9, 2022 Office Action issued in U.S. Appl. No. 17/437,027.

Dec. 6, 2022 Office Action issued in U.S. Appl. No. 17/437,027.

May 9, 2023 Office Action issued in U.S. Appl. No. 17/437,027.

Dec. 11, 2023 U.S. Notice of Allowance issued in U.S. Appl. No. 17/437,027.

* cited by examiner

FIG. 9

| CONFIGU-RATION ID | VEHICLE MAKER | MODEL | ID OF APPLICATION IN EXISTING NETWORK | ID OF APPLICATION TO BE ADDED | FEASIBILITY INFORMATION |
|---|---|---|---|---|---|
| 00001 | COMPANY A | aaaa | ID-A,ID-B,ID-C | ID-G | SUCCESS |
| 00002 | COMPANY A | aaaa | | ID-H | SUCCESS |
| 00003 | COMPANY A | aaaa | | ID-I | SUCCESS |
| 00004 | COMPANY A | aaaa | | ID-G,ID-H | SUCCESS |
| 00005 | COMPANY A | aaaa | | ID-G,ID-I | FAILURE |
| 00006 | COMPANY A | aaaa | | ID-H,ID-I | FAILURE |
| 00007 | COMPANY A | aaaa | | ID-G,ID-H,ID-I | NONE (UNVERIFIED) |
| 00008 | COMPANY A | bbbb | | ID-G | SUCCESS |
| 00009 | COMPANY A | bbbb | | ID-H | SUCCESS |
| 00010 | COMPANY A | bbbb | | ID-I | SUCCESS |
| 00011 | COMPANY A | bbbb | | ID-G,ID-H | FAILURE |
| 00012 | COMPANY A | bbbb | | ID-G,ID-I | NONE (UNVERIFIED) |
| 00013 | COMPANY A | bbbb | | ID-H,ID-I | NONE (UNVERIFIED) |
| 00014 | COMPANY A | bbbb | | ID-G,ID-H,ID-I | FAILURE |
| 00015 | COMPANY A | aaaa | | ID-G | SUCCESS |
| 00016 | COMPANY B | aaaa | | ID-H | SUCCESS |
| 00017 | COMPANY B | aaaa | | ID-I | SUCCESS |
| 00018 | COMPANY B | aaaa | | ID-G,ID-H | FAILURE |
| ⋮ | ⋮ | ⋮ | ⋮ | ⋮ | ⋮ |
| 00101 | COMPANY A | aaaa | ID-A, ID-B, ID-D | ID-E | SUCCESS |
| 00102 | COMPANY A | aaaa | | ID-F | SUCCESS |
| 00103 | COMPANY A | aaaa | | ID-G | NONE (UNVERIFIED) |
| ⋮ | ⋮ | ⋮ | ⋮ | ⋮ | ⋮ |
| 00218 | COMPANY C | cccc | ID-A, ID-B | ID-C | FAILURE |
| 00219 | COMPANY C | cccc | | ID-D | FAILURE |
| 00220 | COMPANY C | cccc | | ID-C,ID-D | SUCCESS |
| ⋮ | ⋮ | ⋮ | ⋮ | ⋮ | ⋮ |

FIG. 10

| CONFIGURATION ID | HARDWARE DEVICE | PORT NUMBER | VID |
|---|---|---|---|
| 00001 | TCU111A | 1 | VLAN10 |
| 00001 | INTAKE PRESSURE SENSOR 111B | 1 | VLAN20 |
| 00001 | ENGINE ECU 111C | 1 | VLAN20 |
| 00001 | TEMPERATURE SENSOR 111D | 1 | VLAN30 |
| 00001 | WATER TEMPERATURE SENSOR 111E | 1 | VLAN30 |
| 00001 | RELAY DEVICE 112 | 1 | VLAN10 |
| 00001 | RELAY DEVICE 112 | 2 | VLAN20 |
| 00001 | RELAY DEVICE 112 | 3 | VLAN20, VLAN30 |
| 00001 | IMAGE SENSOR 111G | 1 | VLAN20 |
| 00002 | TCU111A | 1 | VLAN10 |
| 00002 | INTAKE PRESSURE SENSOR 111B | 1 | VLAN20 |
| | ⋮ | ⋮ | ⋮ |
| 00101 | TCU111A | 1 | VLAN10 |
| 00101 | INTAKE PRESSURE SENSOR 111B | 1 | VLAN20 |
| 00101 | ENGINE ECU 111C | 1 | VLAN20 |
| | ⋮ | ⋮ | ⋮ |

MANAGEMENT DEVICE, COMMUNICATION SYSTEM, VEHICLE, VEHICLE COMMUNICATION MANAGEMENT METHOD, AND VEHICLE COMMUNICATION MANAGEMENT PROGRAM

TECHNICAL FIELD

The present invention relates to a management device, a communication system, a vehicle, a vehicle communication management method, and a vehicle communication management program.

This application claims priority on Japanese Patent Application No. 2019-39558 filed on Mar. 5, 2019, the entire content of which is incorporated herein by reference.

BACKGROUND ART

PATENT LITERATURE 1 (Japanese Laid-Open Patent Publication No. 2018-192876) discloses a driving assistance device as follows. That is, the driving assistance device is connectable to an in-vehicle network including one or more communication buses, and includes: a message acquisition unit that acquires a communication message flowing on the communication bus; a determination unit that determines whether or not an electronic control device for vehicle control is connected to the communication bus, based on the communication message acquired by the message acquisition unit; and a communication control unit that, when the determination unit has determined that the electronic control device is connected to the communication bus, stops transmission of the communication message to the communication bus to which the electronic control device is connected.

Meanwhile, PATENT LITERATURE 2 (Japanese Laid-Open Patent Publication No. 2017-220220) discloses an electronic control device for a vehicle as follows. That is, the electronic control device for a vehicle is an electronic control device (1 to 5) that is connected to an on-vehicle network (6) and executes a predetermined function based on an application installed therein. Each electronic control device includes: a service interface (8) that, in response to a request from the application, requests a service of using a function installed in another electronic control device connected to the on-vehicle network, and that, upon receiving a service request from the other electronic control device, creates the service and responds to the request; a service bus (9) that transmits and receives messages corresponding to a service request and a service response according to a predetermined protocol between the service interface and the service interface of the other electronic control device; and a service management unit (11) that manages the position of the service to allow the service to be dynamically and mutually used.

CITATION LIST

Patent Literature

PATENT LITERATURE 1: Japanese Laid-Open Patent Publication No. 2018-192876

PATENT LITERATURE 2: Japanese Laid-Open Patent Publication No. 2017-220220

SUMMARY OF INVENTION

A management device according to the present disclosure includes: a detection unit configured to detect addition of a function unit to a network including one or a plurality of on-vehicle function units; a generation unit configured to acquire function unit information of a new function unit that is the function unit the addition of which has been detected by the detection unit, and function unit information of the on-vehicle function unit, and configured to generate, based on the respective pieces of function unit information acquired, configuration information of a new network that is the network in which the new function unit is further included; and an acquisition unit configured to acquire, from a database in a storage device, feasibility information indicating feasibility of the new network and corresponding to the configuration information generated by the generation unit.

A communication system according to the present disclosure includes a management device, and one or a plurality of on-vehicle function units constructing a network. The management device detects addition of a function unit to the network, and acquires function unit information from a new function unit that is the function unit the addition of which has been detected. The one or the plurality of on-vehicle function units transmit function unit information thereof to the management device. Based on the function unit information acquired from the new function unit and on the function unit information received from the one or the plurality of on-vehicle function units, the management device generates configuration information of a new network that is the network in which the new function unit is further included. The management device acquires, from a database in a storage device, feasibility information indicating feasibility of the new network and corresponding to the generated configuration information.

A vehicle communication management method according to the present disclosure is a method performed by a management device, a vehicle communication management method is a method performed by a management device, and the method includes: detecting addition of a function unit to a network including one or a plurality of on-vehicle function units; acquiring function unit information of a new function unit that is the function unit the addition of which has been detected, and function unit information of the on-vehicle function unit, and generating, based on the respective pieces of function unit information acquired, configuration information of a new network that is the network in which the new function unit is further included; and acquiring, from a database in a storage device, feasibility information indicating feasibility of the new network and corresponding to the generated configuration information.

A vehicle communication management method according to the present disclosure is a method performed in a communication system that includes a management device and one or a plurality of on-vehicle function units constructing a network, and the method includes: a step in which the management device detects addition of a function unit to the network, and acquires function unit information from a new function unit that is the function unit the addition of which has been detected; a step in which the one or the plurality of on-vehicle function units transmit function unit information thereof to the management device; a step in which the management device generates configuration information of a new network that is the network in which the new function unit is further included, based on the function unit information acquired from the new function unit and on the function unit information received from the one or the plurality of on-vehicle function units; and a step in which the management device acquires, from a database in a storage device, feasibility information indicating feasibility of the new network and corresponding to the generated configuration information.

A vehicle communication management program according to the present disclosure is a program used in a management device, and the program causes a computer to function as: a detection unit configured to detect addition of a function unit to a network including one or a plurality of on-vehicle function units; a generation unit configured to acquire function unit information of a new function unit that is the function unit the addition of which has been detected by the detection unit, and function unit information of the on-vehicle function unit, and configured to generate, based on the respective pieces of function unit information acquired, configuration information of a new network that is the network in which the new function unit is further included; and an acquisition unit configured to acquire, from a database in a storage device, feasibility information indicating feasibility of the new network and corresponding to the configuration information generated by the generation unit.

One mode of the present disclosure can be realized as a semiconductor integrated circuit that realizes a part or the entirety of the management device. One mode of the present disclosure can be realized as a semiconductor integrated circuit that realizes a part or the entirety of the communication system. One mode of the present disclosure can be realized as a program for causing a computer to perform steps of processing in the communication system.

BRIEF DESCRIPTION OF DRAWINGS

FIG. 9 shows an example of a success/failure database stored in a storage device in the communication system according to the embodiment of the present disclosure.

FIG. 10 shows an example of a setting database stored in the storage device in the communication system according to the embodiment of the present disclosure.

DESCRIPTION OF EMBODIMENTS

Figure 1:
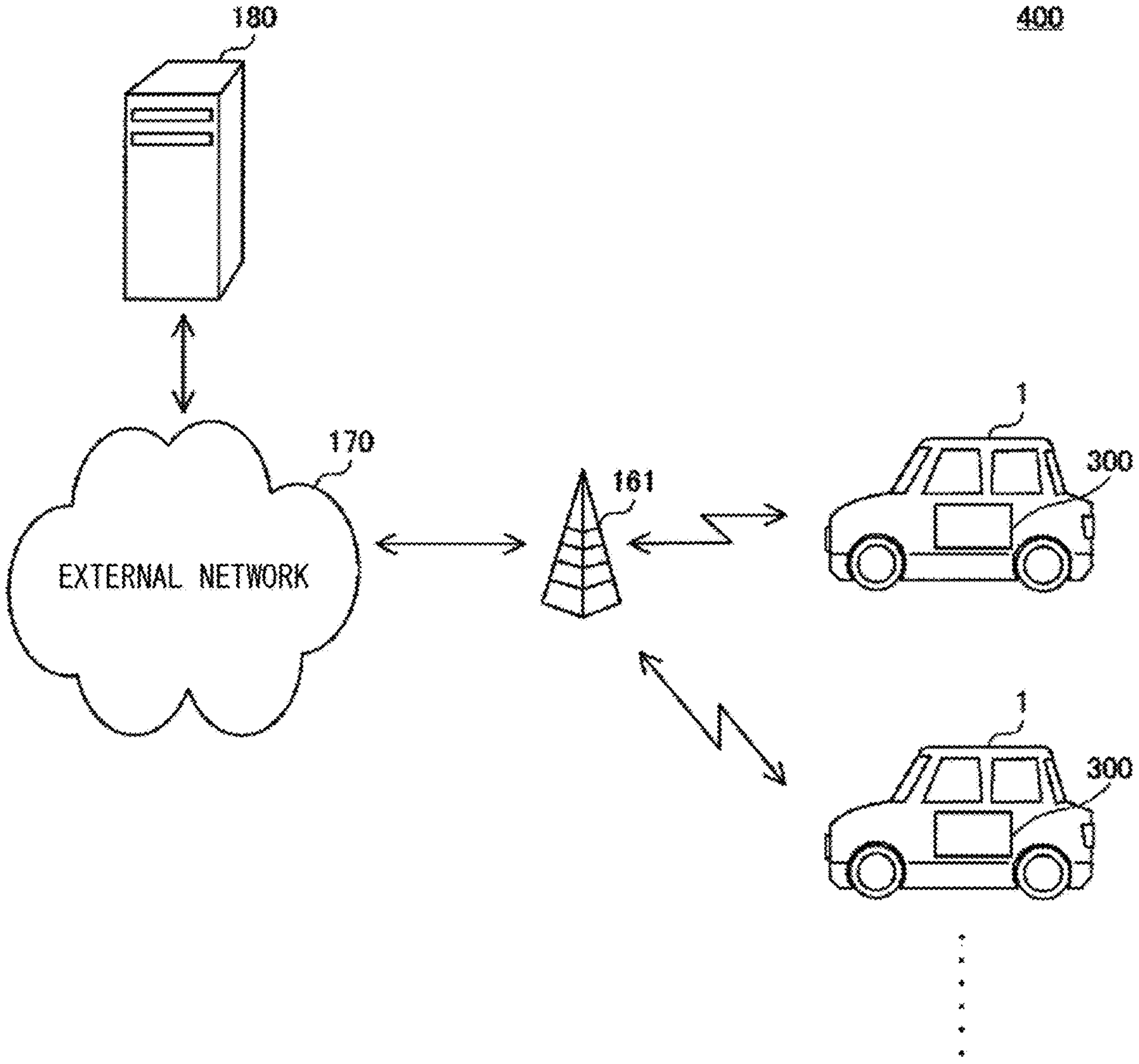
FIG. 1 shows a configuration of a communication system according to an embodiment of the present disclosure.

In recent years, as car sharing becomes widespread and demand for improved processing abilities of on-vehicle devices installed in a vehicle increases, it is desired to customize an on-vehicle network by adding applications to the on-vehicle network. Thus, a technology that enables various applications to be added and removed to and from the on-vehicle network according to a user's needs has been demanded.

Problems to be Solved by the Present Disclosure

Beyond the technologies described in PATENT LITERATURES 1 and 2, a technology capable of flexibly constructing a network of a new configuration while maintaining a stable operation in the network has been demanded.

The present disclosure has been made to solve the above problems and an object of the present disclosure is to provide a management device, a communication system, a vehicle, a vehicle communication management method, and a vehicle communication management program capable of flexibly constructing a network of a new configuration while maintaining a stable operation in the network.

Effects of the Present Disclosure

According to the present disclosure, it is possible to flexibly construct a network of a new configuration while maintaining a stable operation in the network.

Description of Embodiment of the Present Disclosure

First, contents of embodiments of the present disclosure are listed and described.

(1) A management device according to an embodiment of the present disclosure includes: a detection unit configured to detect addition of a function unit to a network including one or a plurality of on-vehicle function units; a generation unit configured to acquire function unit information of a new function unit that is the function unit the addition of which has been detected by the detection unit, and function unit information of the on-vehicle function unit, and configured to generate, based on the respective pieces of function unit information acquired, configuration information of a new network that is the network in which the new function unit is further included; and an acquisition unit configured to acquire, from a database in a storage device, feasibility information indicating feasibility of the new network and corresponding to the configuration information generated by the generation unit.

As described above, since the configuration information of the new network including the detected new function unit is generated and the feasibility information indicating the feasibility of the new network is acquired from the database, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit, for example, occurrence of a delay, in communication of high importance, which may be caused by addition of a new function unit to the network. Consequently, a network of a new configuration can be flexibly constructed while maintaining a stable operation in the network.

(2) Preferably, the management device further includes a notification unit configured to, based on the feasibility information acquired by the acquisition unit, notify at least one of the new function unit and the one or the plurality of on-vehicle function units which construct the new network, of a setting content for performing communication in the new network.

With this configuration, the setting content of each function unit can be changed to an appropriate content according to specifications (e.g., topology) related to communication in the new network.

(3) Preferably, the notification unit specifies, from among the new function unit and one or a plurality of function units included in the network before the addition of the new function unit, a function unit whose setting content needs to be changed for performing communication in the new network, and notifies the specified function unit of the setting content.

With this configuration, for example, notification of the setting content to a function unit whose setting content need not be changed can be omitted while a function unit whose setting content needs to be changed is notified of the setting content. Therefore, it is possible to inhibit unnecessary communication between the management device and the function units.

(4) Preferably, the generation unit changes a generation condition, based on the feasibility information acquired by the acquisition unit, and newly generates the configuration information according to the changed generation condition.

With this configuration, if it is difficult to successfully construct a new network, for example, configuration information of a new network, in which the additional content of a new function unit to the network is changed, is newly generated, and feasibility information of the changed new network can be acquired. Thus, more flexible construction of a new network can be realized.

(5) Preferably, the management device further includes a storage unit configured to store therein the configuration information generated by the generation unit, and the feasibility information corresponding to the configuration information.

With this configuration, when a new network is constructed by adding a new function unit to an existing network, configuration information of the existing network can be acquired from the storage unit, thereby simplifying the network construction process.

(6) A vehicle according to the embodiment of the present disclosure includes the management device.

With this configuration, in the vehicle including the management device, a network of a new configuration can be flexibly constructed while maintaining the stable operation in the network.

(7) A communication system according to the embodiment of the present disclosure includes a management device, and one or a plurality of on-vehicle function units constructing a network. The management device detects addition of a function unit to the network, and acquires function unit information from a new function unit that is the function unit the addition of which has been detected. The one or the plurality of on-vehicle function units transmit function unit information thereof to the management device. Based on the function unit information acquired from the new function unit and on the function unit information received from the one or the plurality of on-vehicle function units, the management device generates configuration information of a new network that is the network in which the new function unit is further included. The management device acquires, from a database in a storage device, feasibility information indicating feasibility of the new network and corresponding to the generated configuration information.

As described above, since the configuration information of the new network including the detected new function unit is generated and the feasibility information indicating the feasibility of the new network is acquired from the database, it is possible to construct the new network by using a verification result of the feasibility of the network having been verified in advance. Thus, it is possible to construct, as a new network, a network whose feasibility has been ensured while considering the logical configuration and the physical configuration thereof, for example. Therefore, it is possible to inhibit occurrence of a communication delay which will be caused by addition of a new function unit to the network. Consequently, a network of a new configuration can be flexibly constructed while maintaining a stable operation in the network.

(8) Preferably, the communication system further includes an update unit configured to update the database in the storage device.

With this configuration, a new combination of configuration information and feasibility information of a network can be registered in the database, whereby a variety of networks can be constructed.

(9) Preferably, when the management device has detected abnormality in the new network, the management device transmits, to the update unit, abnormality detection information indicating the configuration information of the new network and the occurrence of the abnormality in the new network, and the update unit updates the database, based on the abnormality detection information received from the management device.

With this configuration, occurrence of abnormality in the new network can be reflected in the database, whereby a more stable new network can be constructed by using the updated database.

(10) Preferably, the communication system further includes a verification unit configured to verify the feasibility of the configuration information generated by the management device, when the feasibility information corresponding to the configuration information generated by the management device is not present in the database.

With this configuration, if the feasibility of the new network has not been verified in advance, feasibility information of the new network can be acquired by new verification to attempt construction of the new network.

(11) A vehicle communication management method according to the embodiment of the present disclosure is a method performed by a management device, and the method includes: detecting addition of a function unit to a network including one or a plurality of on-vehicle function units; acquiring function unit information of a new function unit that is the function unit the addition of which has been detected, and function unit information of the on-vehicle function unit, and generating, based on the respective pieces of function unit information acquired, configuration information of a new network that is the network in which the new function unit is further included; and acquiring, from a database in a storage device, feasibility information indicating feasibility of the new network and corresponding to the generated configuration information.

As described above, since the configuration information of the new network including the detected new function unit is generated and the feasibility information indicating the feasibility of the new network is acquired from the database, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which will be caused by addition of a new function unit to the network. Consequently, a network of a new configuration can be flexibly constructed while maintaining a stable operation in the network.

(12) A vehicle communication management method according to the embodiment of the present disclosure is a method performed in a communication system that includes a management device and one or a plurality of on-vehicle function units constructing a network, and the method includes: a step in which the management device detects addition of a function unit to the network, and acquires function unit information from a new function unit that is the function unit the addition of which has been detected; a step in which the one or the plurality of on-vehicle function units transmit function unit information thereof to the management device; a step in which the management device generates configuration information of a new network that is the network in which the new function unit is further included, based on the function unit information acquired from the new function unit and on the function unit information received from the one or the plurality of on-vehicle function units; and a step in which the management device acquires, from a database in a storage device, feasibility information indicating feasibility of the new network and corresponding to the generated configuration information.

As described above, since the configuration information of the new network including the detected new function unit is generated and the feasibility information indicating the feasibility of the new network is acquired from the database, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which will be caused by addition of a new function unit to the network. Consequently, a network of a new configuration can be flexibly constructed while maintaining a stable operation in the network.

(13) A vehicle communication management program according to the embodiment of the present disclosure is a program used in a management device, and the program causes a computer to function as: a detection unit configured to detect addition of a function unit to a network including one or a plurality of on-vehicle function units; a generation unit configured to acquire function unit information of a new function unit that is the function unit the addition of which has been detected by the detection unit, and function unit information of the on-vehicle function unit, and configured to generate, based on the respective pieces of function unit information acquired, configuration information of a new network that is the network in which the new function unit is further included; and an acquisition unit configured to acquire, from a database in a storage device, feasibility information indicating feasibility of the new network and corresponding to the configuration information generated by the generation unit.

As described above, since the configuration information of the new network including the detected new function unit is generated and the feasibility information indicating the feasibility of the new network is acquired from the database, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which will be caused by addition of a new function unit to the network. Consequently, a network of a new configuration can be flexibly constructed while maintaining a stable operation in the network.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

[Communication System]

FIG. 1 shows a configuration of a communication system according to an embodiment of the present disclosure.

With reference to FIG. 1, a communication system 400 includes a server 180 and one or a plurality of vehicle communication systems 300. Each vehicle communication system 300 is installed in a vehicle 1.

Figure 2:
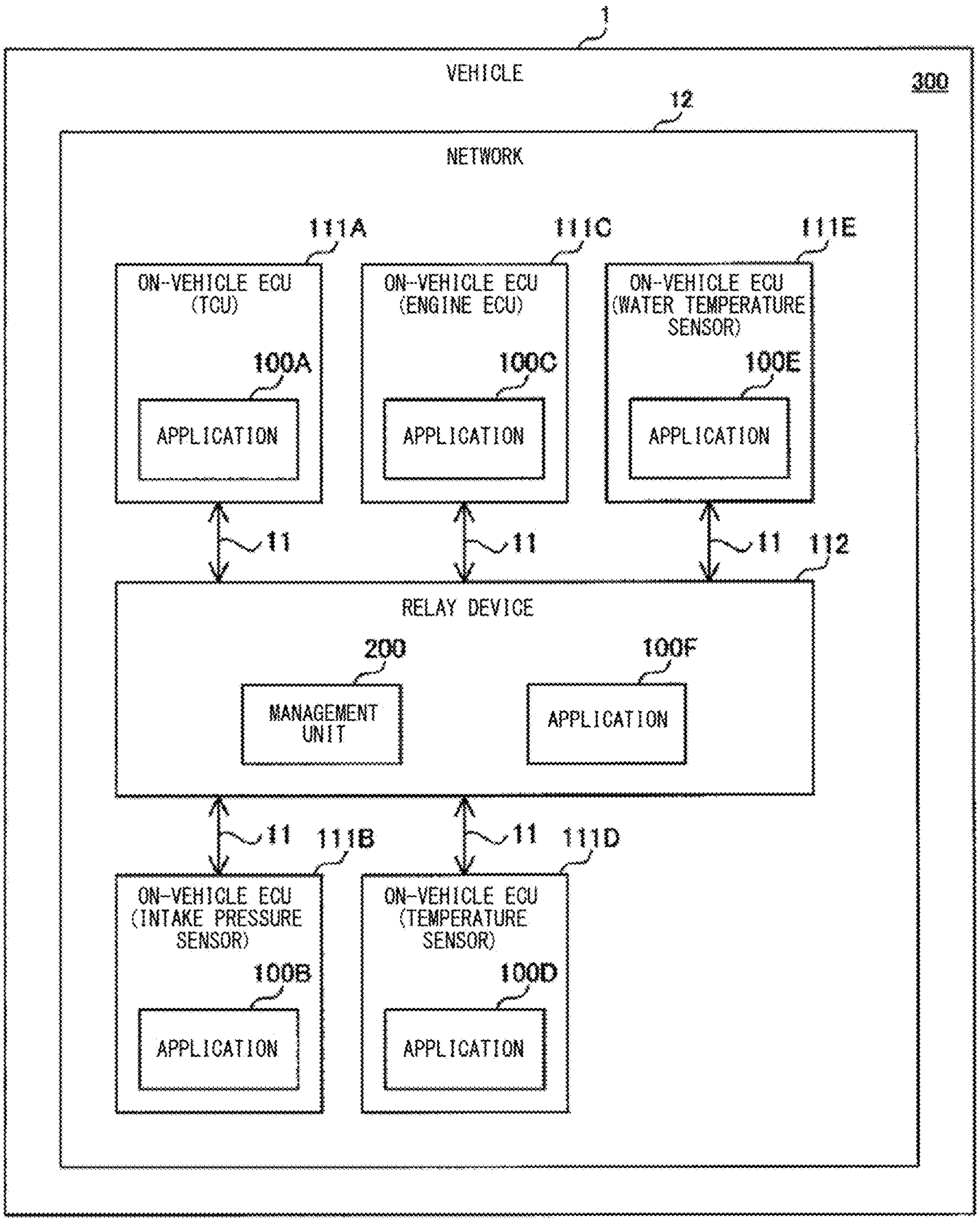
FIG. 2 shows an example of a configuration of a vehicle communication system according to the embodiment of the present disclosure.

FIG. 2 shows an example of a configuration of a vehicle communication system according to the embodiment of the present disclosure.

With reference to FIG. 2, the vehicle communication system 300 includes one or a plurality of on-vehicle ECUs (Electronic Control Units) 111, and a relay device 112. Specifically, the vehicle communication system 300 includes on-vehicle ECUs 111A to 111E as the on-vehicle ECUs 111. The relay device 112 includes a management unit 200.

Each of the on-vehicle ECUs 111A to 111E and the relay device 112 includes an application 100.

In more detail, the on-vehicle ECU 111A includes an application 100A, the on-vehicle ECU 111B includes an application 100B, the on-vehicle ECU 111C includes an application 100C, the on-vehicle ECU 111D includes an application 100D, the on-vehicle ECU 111E includes an application 100E, and the relay device 112 includes an application 100F.

The on-vehicle ECUs 111A to 111E and the relay device 112 construct a network 12.

Of function units, i.e., objects, in the network 12, the on-vehicle ECUs 111 and the applications 100 are examples of on-vehicle function units that are function units installed in the vehicle 1. The relay device 112 is an example of a management device.

The vehicle communication system 300 may not necessarily include five on-vehicle ECUs 111, and may include one, two, three, four, six or more on-vehicles ECU 111. Moreover, one on-vehicle ECU 111 may not necessarily be provided with one application 100, and may be provided with two or more applications 100.

The vehicle communication system 300 may not necessarily include one relay device 112, and may include a plurality of relay devices 112. Moreover, one relay device 112 may not necessarily be provided with one application 100, and may be provided with two or more applications 100.

The network 12 may include, as function units, i.e., objects, an external device placed outside the vehicle 1 and an application included in this external device.

Examples of the on-vehicle ECUs 111 include a TCU (Telematics Communication Unit), an automated driving ECU, an engine ECU, a sensor, a navigation device, a human/machine interface, and a camera.

In this example, the on-vehicle ECUs 111A, 111B, 111C, 111D, and 111E are a TCU, an intake pressure sensor, an engine ECU, a temperature sensor, and a water temperature sensor, respectively.

Hereinafter, the on-vehicle ECUs 111A, 111B, 111C, 111D, and 111E are also referred to as a TCU 111A, an intake pressure sensor 111B, an engine ECU 111C, a temperature sensor 111D, and a water temperature 111E, respectively.

In the network 12, the on-vehicle ECUs 111A to 111E are each connected to the relay device 112 via an Ethernet (registered trademark) cable 11.

The relay device 112 is, for example, a gateway device, and is capable of relaying data between the plurality of on-vehicle ECUs 111 connected thereto.

The relay device 112 performs an Ethernet frame relaying process in accordance with a communication standard of Ethernet. Specifically, the relay device 112 relays, for example, an Ethernet frame that is exchanged between the on-vehicle ECUs 111. An IP packet is stored in the Ethernet frame.

In the vehicle communication system 300, the Ethernet frame relaying process may not necessarily be performed in accordance with the communication standard of Ethernet. For example, data may be relayed in accordance with any of communication standards such as CAN (Controller Area Network) (registered trademark), FlexRay (registered trademark), MOST (Media Oriented Systems Transport) (registered trademark), and LIN (Local Interconnect Network).

With reference to FIG. 1 and FIG. 2, the TCU 111A is capable of communicating with the server 180. Specifically, the TCU 111A is capable of communicating with the server 180 via a wireless base station device 161 by using an IP packet.

More specifically, the TCU 111A is capable of wirelessly communicating with the wireless base station device 161 in accordance with a communication standard such as LTE (Long Term Evolution) or 3G.

Specifically, upon receiving an IP packet from the server 180 via an external network 170, the wireless base station device 161 inserts the received IP packet in a wireless signal, and transmits the wireless signal to the TCU 111A.

Upon receiving, from the wireless base station device 161, the wireless signal including the IP packet from the server 180, for example, the TCU 111A acquires the IP packet from the received wireless signal, stores the acquired IP packet in an Ethernet frame, and transmits the Ethernet frame to the relay device 112.

Upon receiving an Ethernet frame from the relay device 112, the TCU 111A acquires an IP packet from the received Ethernet frame, inserts the acquired IP packet in a wireless signal, and transmits the wireless signal to the wireless base station device 161.

Upon receiving the wireless signal from the TCU 111A, the wireless base station device 161 acquires the IP packet from the received wireless signal, and transmits the acquired IP packet to the server 180 via the external network 170.

The intake pressure sensor 111B is capable of communicating with another on-vehicle ECU 111 via the relay device 112, and, for example, periodically measures the intake pressure of the engine in the vehicle 1.

The engine ECU 111C is capable of communicating with another on-vehicle ECU 111 via the relay device 112, and, for example, controls the engine in the vehicle 1.

In more detail, for example, the engine ECU 111C acquires information indicating the rotation speed of the engine, the vehicle speed of the vehicle 1, the shaft torque of the engine, the state of the transmission, the state of a throttle valve, measurement values of the sensors, and the like, and controls the engine, based on the acquired information.

The engine ECU 111C is capable of transmitting a part or the entirety of the acquired information to the relay device 112, in response to a request from the relay device 112, for example.

The temperature sensor 111D is capable of communicating with another on-vehicle ECU 111 via the relay device 112, and, for example, periodically measures the ambient temperature of the vehicle 1.

The water temperature 111E is capable of communicating with another on-vehicle ECU 111 via the relay device 112, and, for example, periodically measures the temperature of cooling water circulating inside the engine in the vehicle 1.

Each application 100 performs, for example, an application layer process to perform a predetermined process in the on-vehicle ECU 111 or the relay device 112 in which the application 100 is installed. For example, the application 100D in the temperature sensor 111D generates, in a predetermined cycle, temperature information indicating the ambient temperature of the vehicle 1.

Figure 3:
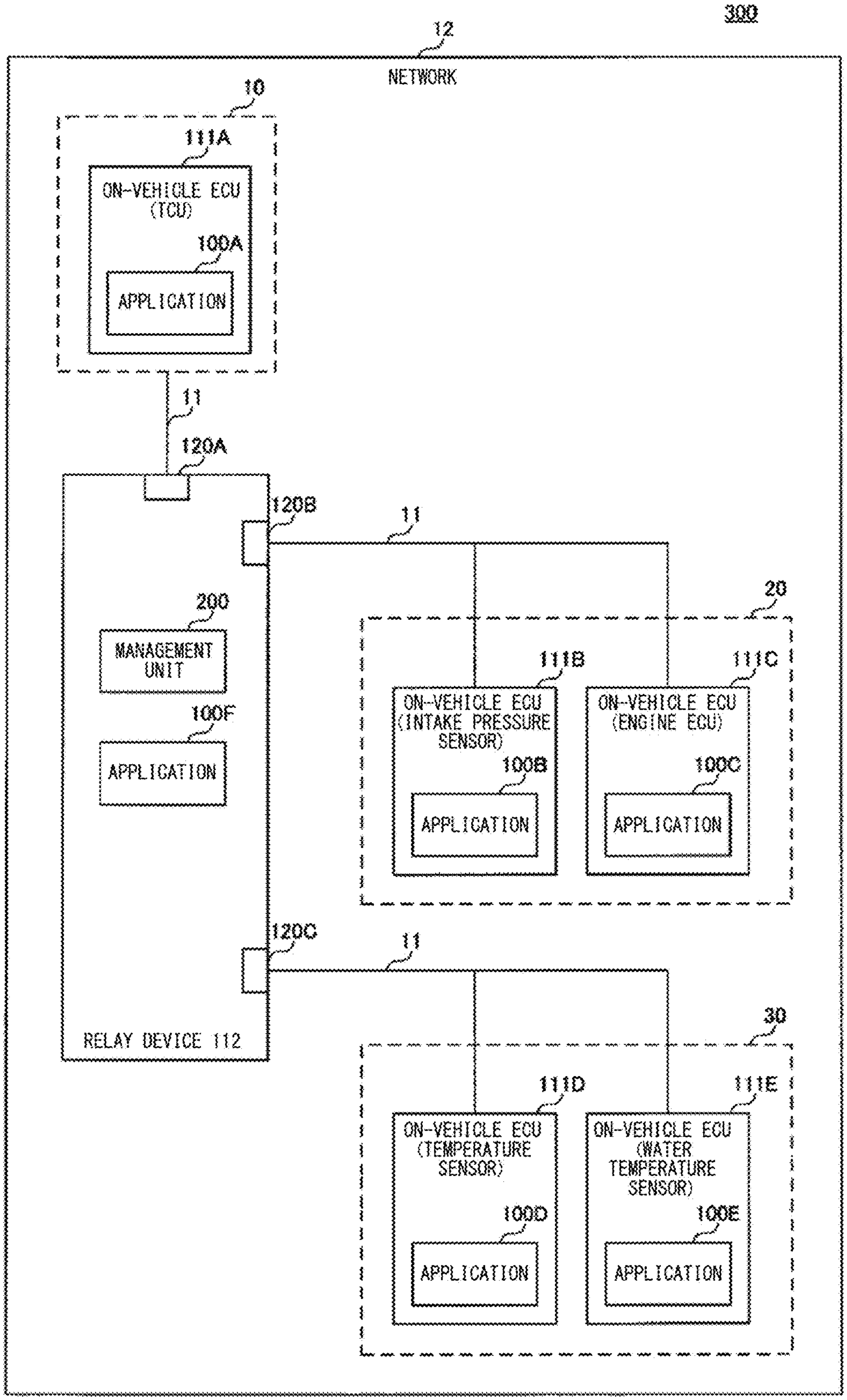
FIG. 3 shows an example of a network configuration in the vehicle communication system according to the embodiment of the present disclosure.

FIG. 3 shows an example of a network configuration in the vehicle communication system according to the embodiment of the present disclosure.

With reference to FIG. 3, the relay device 112 includes communication ports 120A, 120B, and 120C. Each of the communication ports 120A, 120B, and 120C is also referred to as a communication port 120. The communication port 120 is a terminal connectable with an Ethernet cable 11.

In the example shown in FIG. 3, the TCU 111A is connected to the communication port 120A, the intake pressure sensor 111B and the engine ECU 111C are connected to the communication port 120B, and the temperature sensor 111D and the water temperature 111E are connected to the communication port 120C.

In the network 12, the TCU 111A belongs to a VLAN (Virtual Local Area Network) 10. The intake pressure sensor 111B and the engine ECU 111C belong to a VLAN 20 different from the VLAN 10. The temperature sensor 111D and the water temperature 111E belong to a VLAN 30 different from the VLAN 10 and the VLAN 20.

The relay device 112 performs, for example, relaying of an Ethernet frame between the on-vehicle ECUs 111 that belong to the same VLAN. Specifically, based on a transmission source MAC (Media Access Control) address and a transmission destination MAC address included in a received Ethernet frame, the relay device 112 transmits the Ethernet frame to a destination on-vehicle ECU 111.

Moreover, the relay device 112 performs, for example, relaying of an IP packet between the on-vehicle ECUs 111 that belong to different VLANs. Specifically, the relay device 112 acquires an IP packet from the received Ethernet frame, and transmits the IP packet to a destination on-vehicle ECU 111, based on a destination IP address of the acquired IP packet.

[Management Unit]

Figure 4:
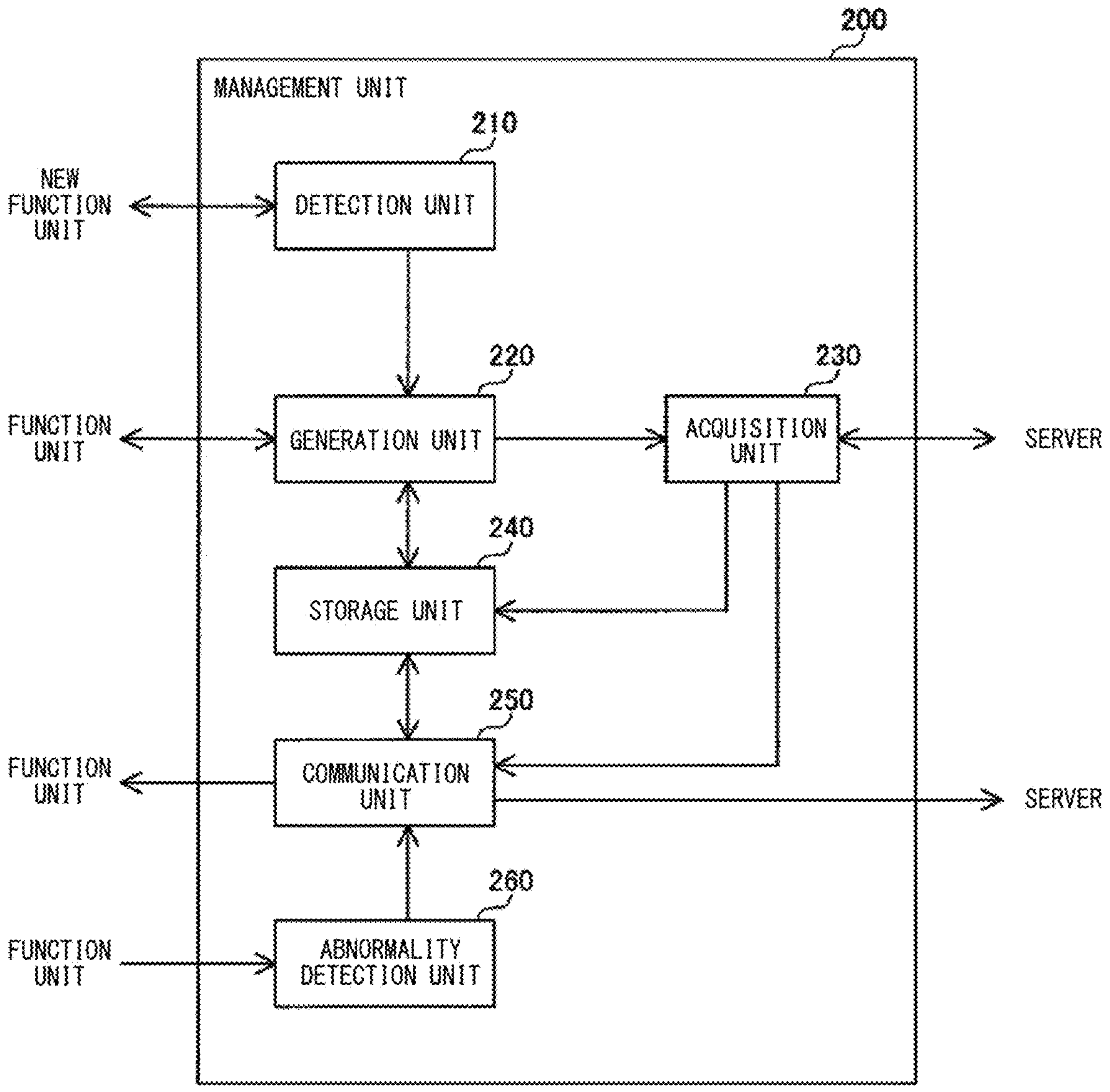
FIG. 4 shows a configuration of a management unit according to the embodiment of the present disclosure.

FIG. 4 shows a configuration of a management unit according to the embodiment of the present disclosure.

With reference to FIG. 4, the management unit 200 includes a detection unit 210, a generation unit 220, an acquisition unit 230, a storage unit 240, a notification unit 250, and an abnormality detection unit 260.

The detection unit 210, the generation unit 220, the acquisition unit 230, the notification unit 250, and the abnormality detection unit 260 are implemented by, for example, a processor such as a CPU (Central Processing Unit) or a DSP (Digital Signal Processor).

[Detection Unit]

The detection unit 210 detects a new function unit that is a function unit to be newly added to the network 12. That is, the detection unit 210 detects addition of the new function unit to the network 12. In more detail, the detection unit 210 detects additions of an on-vehicle ECU 111, an external device, an application 100, etc., to the network 12. As one example, the detection unit 210 detects, as a new ECU, an on-vehicle ECU 111 to be newly added to the network 12.

For example, the new function unit transmits, to the detection unit 210, connection request information for requesting communication connection in the network 12.

Upon receiving the connection request information, the detection unit 210 detects the new function unit as the transmission source of the connection request information. The detection unit 210 may, for example, periodically broadcast a search message for detecting a new function unit. In this case, the new function unit receives the search message, and transmits the connection request information as a response to the received search message.

Hereinafter, the network 12 including a new function unit is also referred to as a new network, the network 12 before addition of a new function unit is also referred to as an existing network, and a function unit included in the existing network is also referred to as an existing function unit. An on-vehicle ECU 111 included in the existing network is an example of an existing function unit, i.e., an existing ECU.

Figure 5:
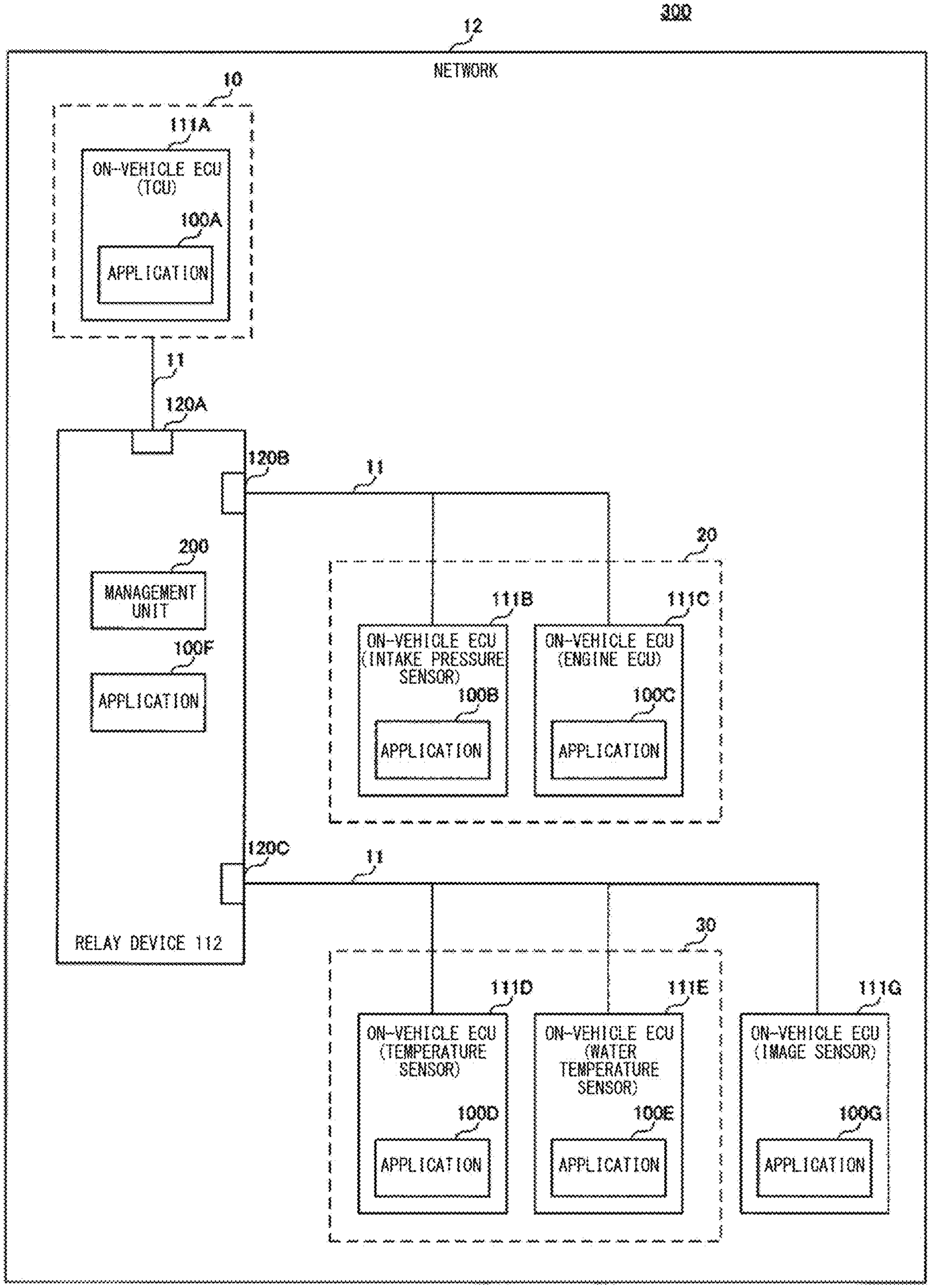
FIG. 5 shows an example of a configuration of a new network in the vehicle communication system according to the embodiment of the present disclosure.

FIG. 5 shows an example of a configuration of a new network in the vehicle communication system according to the embodiment of the present disclosure.

With reference to FIG. 5, it is assumed that an on-vehicle ECU 111G is newly added to the network 12. In this example, the on-vehicle ECU 111G is an image sensor. Hereinafter, the on-vehicle ECU 111G is also referred to as an image sensor 111G. The image sensor 111G includes an application 100G as a new function unit.

When the image sensor 111G receives supply of power and is connected to the communication port 120C in the relay device 112 via the Ethernet cable 11, for example, the image sensor 111G transmits, to the detection unit 210, connection request information for requesting communication connection in the network 12.

In more detail, the application 100G in the image sensor 111G generates an Ethernet frame including the connection request information, its own ID, and the MAC address of the relay device 112 as a transmission destination MAC address, and transmits the generated Ethernet frame to the relay device 112.

Upon receiving the Ethernet frame transmitted from the application 100G, the detection unit 210 in the relay device 112 performs an authentication process for the application 100G by using the ID and the like included in the received Ethernet frame.

When the authentication of the application 100G has been successful, the detection unit 210 generates an Ethernet frame including authentication success information indicating that the authentication has been successful, and the MAC address of the image sensor 111G as a transmission destination MAC address, and transmits the generated Ethernet frame to the image sensor 111G.

A new function unit to be detected by the detection unit 210 is not limited to the application 100 included in the on-vehicle ECU 111 to be newly connected to the relay device 112. For example, the detection unit 210 may detect, as a new function unit, an application 100 to be installed in an on-vehicle ECU 111 in the existing network.

Figure 6:
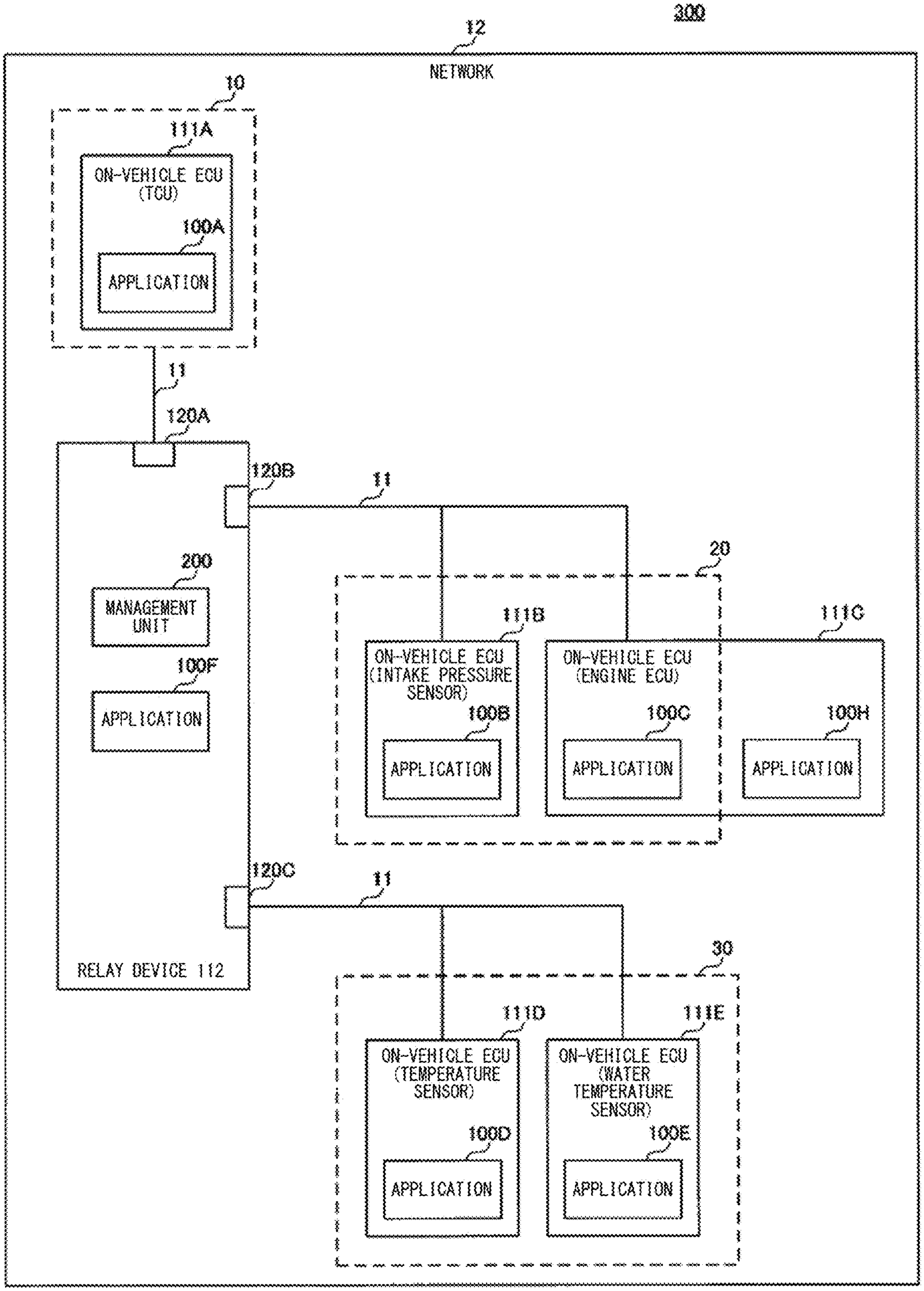
FIG. 6 shows another example of the configuration of the new network in the vehicle communication system according to the embodiment of the present disclosure.

FIG. 6 shows another example of the configuration of a new network in the vehicle communication system according to the embodiment of the present disclosure.

With reference to FIG. 6, it is assumed that, in the network 12, an application 100H is newly installed as a new function unit in the engine ECU 111C that is the existing function unit.

When the application 100H has been installed in the engine ECU 111C, the application 100H generates an Ethernet frame including connection request information, its own ID, and the MAC address of the relay device 112 as a transmission destination MAC address, and transmits the generated Ethernet frame to the relay device 112.

Upon receiving the Ethernet frame transmitted from the application 100H, the detection unit 210 in the relay device 112 performs an authentication process for the application 100H by using the ID and the like included in the received Ethernet frame.

When the authentication of the application 100H has been successful, the detection unit 210 generates an Ethernet frame including authentication success information indicating that the authentication has been successful, and the MAC address of the engine ECU 111C as a transmission destination MAC address, and transmits the generated Ethernet frame to the engine ECU 111C.

A new function unit to be detected by the detection unit 210 is not limited to the application 100 included in the on-vehicle ECU 111 to be newly connected to the relay device 112 or the application 100 to be installed in the on-vehicle ECU 111, as described above. For example, the detection unit 210 may detect, as a new function unit, an application 100 included in an external device 113 to be added to the network 12 outside the vehicle 1.

Figure 7:
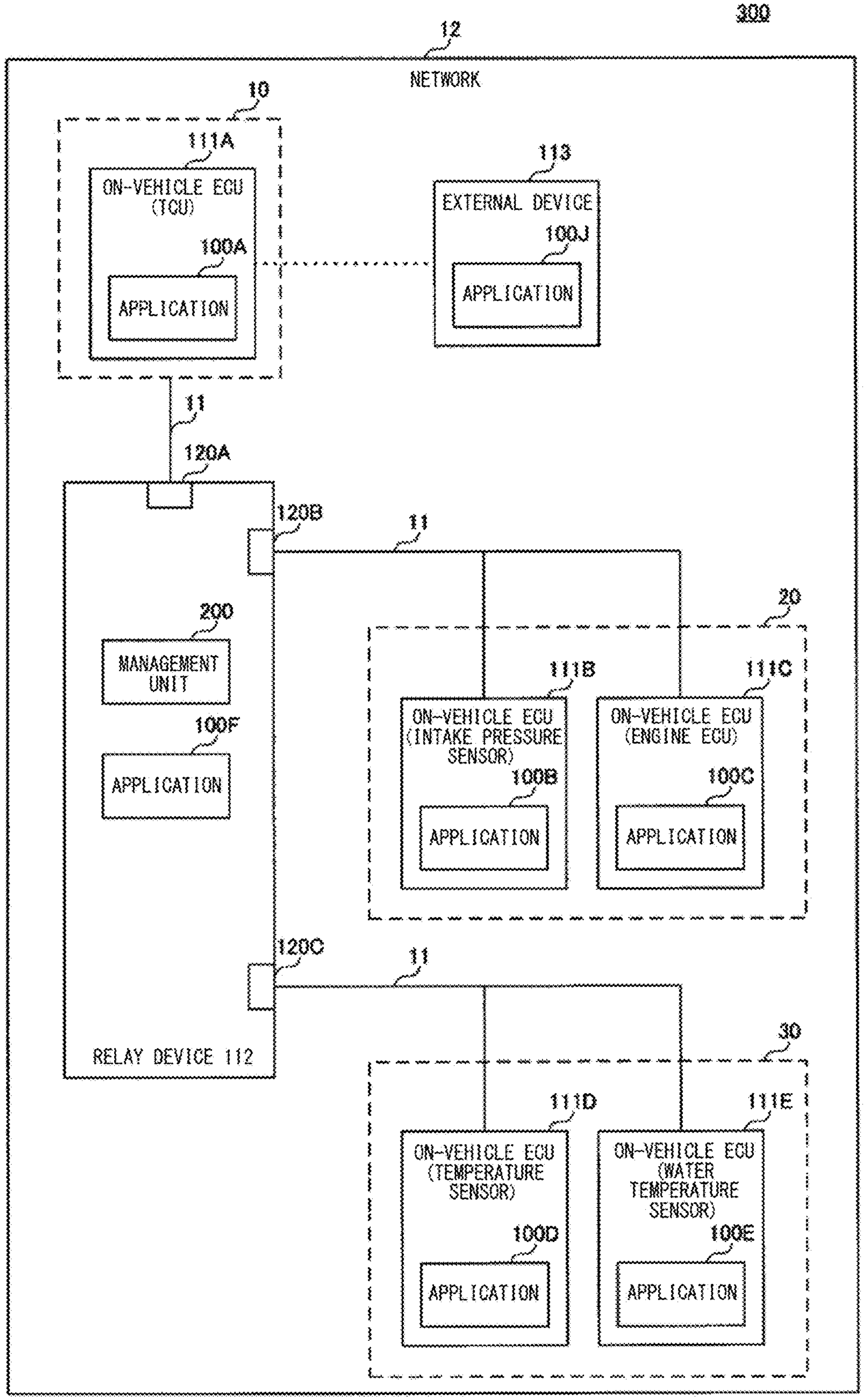
FIG. 7 shows another example of the configuration of the new network in the vehicle communication system according to the embodiment of the present disclosure.

FIG. 7 shows another example of the configuration of a new network in the vehicle communication system according to the embodiment of the present disclosure.

With reference to FIG. 7, it is assumed that an external device 113 is newly added to the network 12. The external device 113 is a device placed outside the vehicle 1. The external device 113 includes an application 100J as a new function unit.

The external device 113 is capable of communicating with the TCU 111A. In more detail, the external device 113 is capable of communicating with the TCU 111A via the wireless base station device 161 by using an IP packet, for example.

The external device 113 transmits connection request information for requesting communication connection in the network 12, to the detection unit 210 via the TCU 111A.

In more detail, the application 100J in the external device 113 transmits an IP packet including the connection request information, its own ID, and the MAC address of the relay device 112, to the wireless base station device 161 via the external network 170.

Upon receiving the IP packet from the external device 113 via the external network 170, the wireless base station device 161 inserts the received IP packet in a wireless signal, and transmits the wireless signal to the TCU 111A.

Upon receiving, from the wireless base station device 161, the wireless signal including the IP packet from the application 100J, the TCU 111A acquires the IP packet from the received wireless signal, generates an Ethernet frame including the acquired IP packet and the MAC address of the relay device 112 as a transmission destination MAC address, and transmits the generated Ethernet frame to the relay device 112.

Upon receiving the Ethernet frame from the TCU 111A, the detection unit 210 in the relay device 112 performs an authentication process for the application 100J by using the ID and the like included in the IP packet stored in the received Ethernet frame.

When the authentication of the application 100J has been successful, the detection unit 210 generates an Ethernet frame including authentication success information indicating that the authentication has been successful, and the MAC address of the external device 113 as a transmission destination MAC address, and transmits the generated Ethernet frame to the TCU 111A.

Upon receiving the Ethernet frame from the detection unit 210, the TCU 111A acquires the IP packet from the received Ethernet frame, inserts the acquired IP packet in a wireless signal, and transmits the wireless signal to the external device 113 via the wireless base station device 161.

When authentication of the new function unit has been successful as described above, the detection unit 210 outputs detection information indicating the ID of the new function unit to the generation unit 220.

[Generation Unit]

The generation unit 220 acquires function unit information of an on-vehicle function unit and function unit information of a new function unit, and generates configuration information of a new network, based on the acquired function unit information.

In more detail, upon receiving the detection information from the detection unit 210, the generation unit 220 acquires the function unit information of the new function unit indicated by the detection information, and acquires the function unit information of the existing function unit.

The generation unit 220 generates the configuration information of the new network, based on the acquired function unit information.

For example, the generation unit 220 acquires, as function unit information, information that allows recognition of topologies of hardware devices such as the on-vehicle ECU 111, the relay device 112, and the external device 113 in the new network. Moreover, for example, the generation unit 220 acquires, as function unit information, information that allows recognition of restriction regarding allocation of applications 100 to the hardware devices in the new network. Moreover, for example, the generation unit 220 acquires information that allows recognition of restriction on the communication method between the applications 100.

For example, the generation unit 220 acquires, as the information that allows recognition of the topologies of the hardware devices, vehicle information indicating the maker and the model of the vehicle 1 in which the on-vehicle ECU 111 and the relay device 112 are installed, additional option information indicating an additional option installed in the vehicle 1, the on-vehicle device ID as an identifier indicating the maker, the serial number, etc., of the on-vehicle ECU 111, the port number of the communication port for connection between the hardware devices, and information about the band width of the communication path between the hardware devices.

The generation unit 220 acquires, for example, the IDs of the applications 100, as the information that allows recognition of restriction regarding allocation of the applications 100 to the hardware devices.

The generation unit 220 acquires, as the information that allows recognition of restriction on the communication method between the applications 100, information indicating the communication standard used for communication between the applications 100, such as Ethernet and CAN.

For example, the generation unit 220 transmits an information request notification indicating a type of function unit information to be transmitted among the types of function unit information as described above, to the existing function unit and the new function unit.

As a response to the information request notification received from the generation unit 220, the existing function unit and the new function unit each transmit, for example, its own function unit information of the type designated in the information request notification, to the generation unit 220.

Upon receiving the function unit information from the existing function unit and the new function unit, the generation unit 220 generates configuration information of a new network, based on the received function unit information.

In more detail, the generation unit 220 generates, as the configuration information, information capable of specifying the function units in the vehicle 1 and the new network.

The generation unit 220 may acquire the configuration information of the existing network as the function unit information of the existing function units, and may generate the configuration information of the new network, based on the acquired configuration information of the existing network and on the function unit information of the new function unit.

In more detail, the storage unit 240 sometimes stores therein the configuration information of the existing network.

The generation unit 220 refers to the storage unit 240, and if the configuration information of the existing network is registered in the storage unit 240, acquires the configuration information from the storage unit 240. In this case, the generation unit 220 transmits an information request notification to the new function unit, but does not transmit the same to the existing function unit.

Upon receiving the function unit information from the new function unit, the generation unit 220 generates the configuration information of the new network, based on the received function unit information of the new function unit and on the configuration information of the existing network acquired from the storage unit 240. Specifically, the generation unit 220 modifies the configuration information of the existing network acquired from the storage unit 240, by using the received function unit information of the new function unit, thereby generating the configuration information of the new network. The generation unit 220 updates the configuration information stored in the storage unit 240 to the new configuration information generated.

The generation unit 220 outputs the generated configuration information of the new network to the acquisition unit 230.

[Acquisition Unit]

The acquisition unit 230 acquires, from a database in the storage device, feasibility information, indicating feasibility of the new network, which corresponds to the configuration information generated by the generation unit 220.

In more detail, the acquisition unit 230 acquires, as the feasibility information, success/failure information indicating whether or not the new network is successful, and setting information indicating the setting content for performing communication in the new network, for example.

Figure 8:
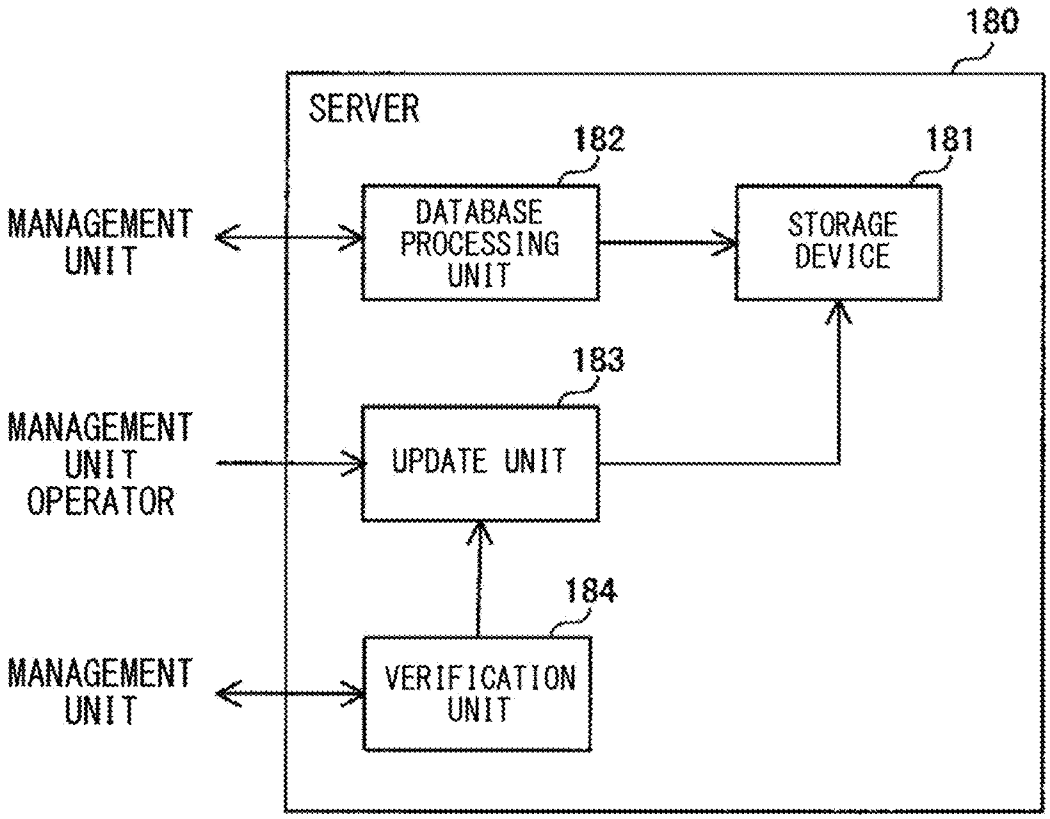
FIG. 8 shows a configuration of a server in the communication system according to the embodiment of the present disclosure.

FIG. 8 shows a configuration of a server in the communication system according to the embodiment of the present disclosure.

With reference to FIG. 8, the server 180 includes a storage device 181, a database processing unit 182, an update unit 183, and a verification unit 184.

For example, the storage device 181 stores therein a success/failure database in which configuration information of a network 12 is associated with success/failure information indicating whether or not this network 12 is successful.

Upon receiving configuration information of a new network from the generation unit 220, the acquisition unit 230 communicates with the server 180 via the TCU 111A to acquire success/failure information corresponding to the configuration information from the success/failure database in the storage device 181.

In more detail, the acquisition unit 230 transmits the configuration information received from the generation unit 220, to the database processing unit 182 in the server 180.

The database processing unit 182 acquires the corresponding success/failure information from the success/failure database by using, as a search key, the configuration information received from the acquisition unit 230. The database processing unit 182 transmits the acquired success/failure information to the acquisition unit 230 in the management unit 200.

FIG. 9 shows an example of the success/failure database stored in the storage device in the communication system according to the embodiment of the present disclosure. In the following, for convenience, it is assumed that the ID of application A is "ID-A", the ID of application B is "ID-B", the ID of application C is "ID-C", the ID of application D is "ID-D", the ID of application E is "ID-E", the ID of application F is "ID-F", the ID of application G is "ID-G", the ID of application His "ID-H", and the ID of application 100J is "ID-J".

With reference to FIG. 8, in the success/failure database stored in the storage device 181, configuration information indicating a combination of vehicle information, the ID of an application 100 in the existing network, and the ID of an application 100 to be added, is associated with success/failure information of a new network indicated by the configuration information.

In this example, for convenience, it is assumed that the topologies of the hardware devices, the band width of the transmission path between the hardware devices, and the like can be specified, based on the vehicle information and the ID of the application 100.

In the success/failure database, each piece of success/failure information indicates "success" or "failure", for example.

In the success/failure database, when the success/failure information corresponding to the configuration information of the new network indicates "success", this means that the new network is successful, whereas, when the success/failure information indicates "failure", this means that the new network is a failure. Moreover, "unverified" in the success/failure database means that the new network has not been subjected to success/failure verification and therefore success/failure information thereof is not present.

The acquisition unit 230 receives, from the generation unit 220, the configuration information indicating the combination of the vehicle information, the ID of the application 100 in the existing network, and the ID of the application 100 to be added, and transmits the received configuration information to the database processing unit 182 in the server 180.

For example, the database processing unit 182 receives, from the acquisition unit 230, the configuration information indicating that the maker of the vehicle 1 is "company A", the model of the vehicle 1 is "aaaa", the IDs of the applications 100 in the existing network are "ID-A", "ID-B", and "ID-C", and the ID of the application 100 to be added is "ID-G". Then, the database processing unit 182 acquires, from the success/failure database, the success/failure information indicating "success" by using the received configuration information as a search key, and transmits the acquired success/failure information to the acquisition unit 230.

For example, the acquisition unit 230 further acquires setting information indicating the setting content for performing communication in the new network.

In more detail, the acquisition unit 230 acquires the setting information indicating the setting content, of each function unit in the new network, which allows the function unit to perform communication at layer 4 or lower in the OSI (Open Systems Interconnection) model.

For example, the storage device 181 stores therein a setting database in which configuration information of a network 12 is associated with the setting contents of function units in this network 12.

FIG. 10 shows an example of the setting database stored in the storage device in the communication system according to the embodiment of the present disclosure.

Hereinafter, for convenience, the port numbers of the communication ports 120A, 120B, and 120C of the relay device 112 are "1", "2", and "3", respectively. In addition, each on-vehicle ECU 111 includes one communication port, and the port number of the communication port is "1".

With reference to FIG. 10, in the setting database in the storage device 181, for example, configuration IDs and the setting contents of function units in networks 12 indicated by the configuration IDs, i.e., IDs of VLANs for the respective communication ports 120, are registered. Hereinafter, the ID of each VLAN is also referred to as "VID".

With reference to FIG. 9 and FIG. 10, when the database processing unit 182 acquires, from the success/failure database, success/failure information indicating "success" as success/failure information corresponding to configuration information whose configuration ID is "00001", the database processing unit 182 acquires, from the setting database, VIDs of the respective function units as setting information whose configuration ID is "00001".

For example, the success/failure information in the success/failure database and the setting information in the setting database are generated based on the result of verification performed in advance while considering the logical configuration and the physical configuration of the network indicated by the corresponding configuration information.

The database processing unit 182 transmits the acquired setting information to the acquisition unit 230.

For example, when the acquisition unit 230 has acquired the feasibility information from the database in the storage device 181 as described above, the acquisition unit 230 registers, in the storage unit 240, the configuration information generated by the generation unit 220, and the feasibility information corresponding to the configuration information.

Operation Example 1

Upon acquiring, as feasibility information, success/failure information indicating "success" and setting information, the acquisition unit 230 outputs the acquired success/failure information and setting information to the notification unit 250.

Upon receiving the feasibility information from the acquisition unit 230, the notification unit 250, based on the received feasibility information, notifies at least one of the function units in the new network of the setting content for performing communication in the new network.

In more detail, the notification unit 250 specifies a function unit whose setting content needs to be changed for performing communication in the new network, among the new function unit and one or a plurality of existing function units included in the existing network, and notifies the specified function unit of the setting content.

For example, upon receiving the setting information from the acquisition unit 230, the notification unit 250 acquires, from the storage unit 240, setting information indicating the setting contents of the function units in the existing network. Then, the notification unit 250 compares the setting information received from the acquisition unit 230 to the setting information acquired from the storage unit 240, and specifies one or a plurality of function units whose setting contents need to be changed for performing communication in the new network. The notification unit 250 transmits the setting information received from the acquisition unit 230, to the specified function unit.

For example, when a function unit whose setting content needs to be changed is not present in the new network, the notification unit 250 does not transmit the setting information to a function unit.

Upon receiving the setting information from the notification unit 250, the one or the plurality of function units in the new network perform setting change based on the received setting information. The function units in the new network communicate with each other according to the changed setting content.

For example, in the example of FIG. 10, the acquisition unit 230 acquires the setting information indicating that the ID of a VLAN to which the image sensor 111G including the application 100G as a new function unit belongs is "VLAN 20", and the ID of a VLAN corresponding to the communication port 120C of the relay device 112 including the application 100F is "VLAN 20".

The acquisition unit 230 outputs the acquired setting information to the notification unit 250. Based on the setting information received from the acquisition unit 230, the notification unit 250 notifies the image sensor 111G and the relay device 112 of the setting content.

Figure 11:
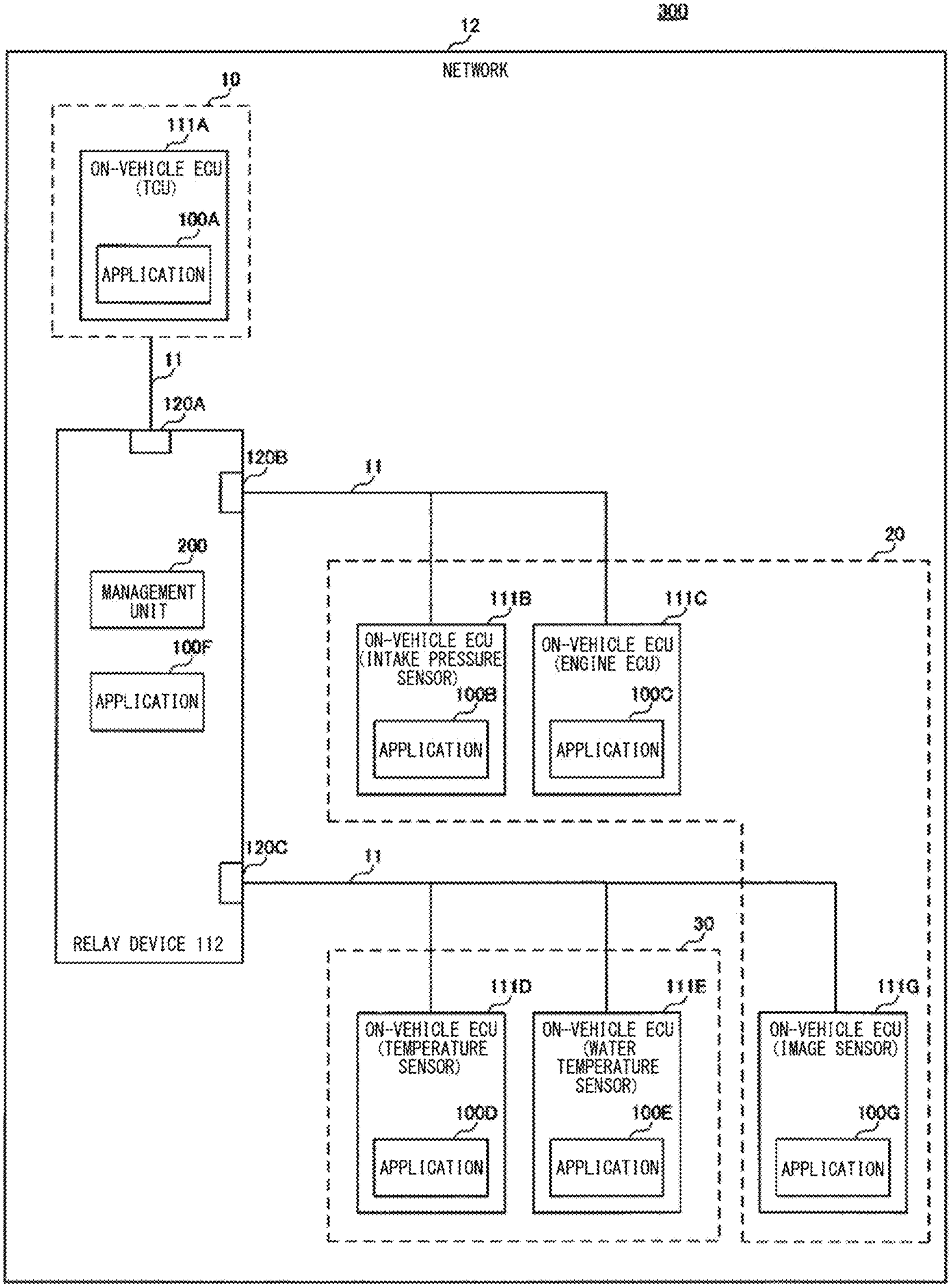
FIG. 11 shows another example of the configuration of the new network after setting change in the vehicle communication system according to the embodiment of the present disclosure.

FIG. 11 shows another example of the configuration of the new network after setting change, in the vehicle communication system according to the embodiment of the present disclosure.

With reference to FIG. 11, in the new network shown in FIG. 5, the image sensor 111G and the relay device 112 perform setting change, based on the setting content notified from the notification unit 250. Thus, the image sensor 111G becomes able to perform communication in the VLAN 20.

When abnormality has occurred in the new network, the notification unit 250 transmits abnormality detection information indicating the occurrence of the abnormality to the server 180.

For example, when abnormality such as packet loss has occurred in the new network, a function unit, e.g., an application 100, in the new network transmits an error log to the abnormality detection unit 260.

Upon receiving the error log, the abnormality detection unit 260 notifies the notification unit 250 of the reception of the error log.

Upon receiving the notification from the abnormality detection unit 260, the notification unit 250 acquires the configuration information of the new network from the storage unit 240, and transmits abnormality detection information indicating the acquired configuration information and the occurrence of abnormality, to the server 180 via the wireless base station device 161.

Upon receiving the abnormality detection information from the notification unit 250, the update unit 183 in the server 180 updates the database in the storage device 181, based on the received abnormality detection information. Specifically, for example, the update unit 183 changes, in the success/failure database, the success/failure information corresponding to the configuration information indicated by the abnormality detection information, from "success" to "failure".

Operation Example 2

Upon receiving success/failure information indicating "failure" as feasibility information, the acquisition unit 230 outputs the acquired success/failure information to the generation unit 220.

Upon receiving the success/failure information indicating "failure" as feasibility information from the acquisition unit 230, the generation unit 220 changes the generation condition, based on the received feasibility information, and newly generates configuration information according to the change generation condition.

For example, the generation unit 220 changes the current generation condition to a generation condition such that some of a plurality of new function units are not added to the network 12, and newly generates configuration information of the new network according to the changed generation condition.

Alternatively, for example, the generation unit 220 changes the generation condition by changing the functional arrangement of the function units in the current generation condition, and newly generates configuration information of the new network according to the changed generation condition.

The generation unit 220 outputs the newly generated configuration information of the new network to the acquisition unit 230.

Upon receiving the configuration information newly generated by the generation unit 220, the acquisition unit 230 acquires success/failure information corresponding to the received configuration information from the success/failure database in the storage device 181.

Operation Example 3

Upon receiving success/failure information indicating "unverified" as feasibility information, the acquisition unit 230 transmits the corresponding configuration information to the verification unit 184 in the server 180 via the wireless base station device 161.

Upon receiving the configuration information from the acquisition unit 230, the verification unit 184 verifies feasibility of the received configuration information. For example, the verification unit 184 simulates the new network to determine whether or not the new network indicated by the received configuration information is successful.

The verification unit 184 generates feasibility information of the configuration information, and transmits the generated feasibility information, as a verification result, to the acquisition unit 230 via the wireless base station device 161. In addition, the verification unit 184 outputs the configuration information and the feasibility information corresponding to the configuration information to the update unit 183.

For example, the update unit 183 in the server 180 updates the success/failure database and the setting database in the storage device 181.

In more detail, the update unit 183 registers the configuration information received from the verification unit 184 and the feasibility information corresponding to the configuration information, in the success/failure database and the setting database in the storage device 181.

Meanwhile, for example, an operator of the maker of the vehicle 1 performs design and verification of a new network 12 including a newly developed function unit. The operator verifies the new network 12 to generate feasibility information of the network, and performs an operation of inputting the generated feasibility information and configuration information corresponding to the feasibility information into the update unit 183.

The update unit 183 registers the configuration information and the feasibility information inputted by the operator, in the success/failure database and the setting database in the storage device 181.

Alternatively, for example, the operator performs an operation of inputting configuration information of a new network 12 including a newly developed function unit, into the verification unit 184. The verification unit 184 generates feasibility information of the configuration information inputted by the operator, and outputs the configuration information and the generated feasibility information to the update unit 183. The update unit 183 registers the configuration information and the feasibility information corresponding to the configuration information received from the verification unit 184, in the success/failure database and the setting database in the storage device 181.

[Operation Flow]

Each device in the vehicle communication system 300 includes a computer including a memory. An arithmetic processing unit such as a CPU in the computer reads out, from the memory, a program including a part or all of the steps in the following flowchart and sequence, and executes the program. Programs for the plurality of devices can be installed from outside. The programs for the plurality of devices are each distributed in a state of being stored in the storage medium.

Figure 12:
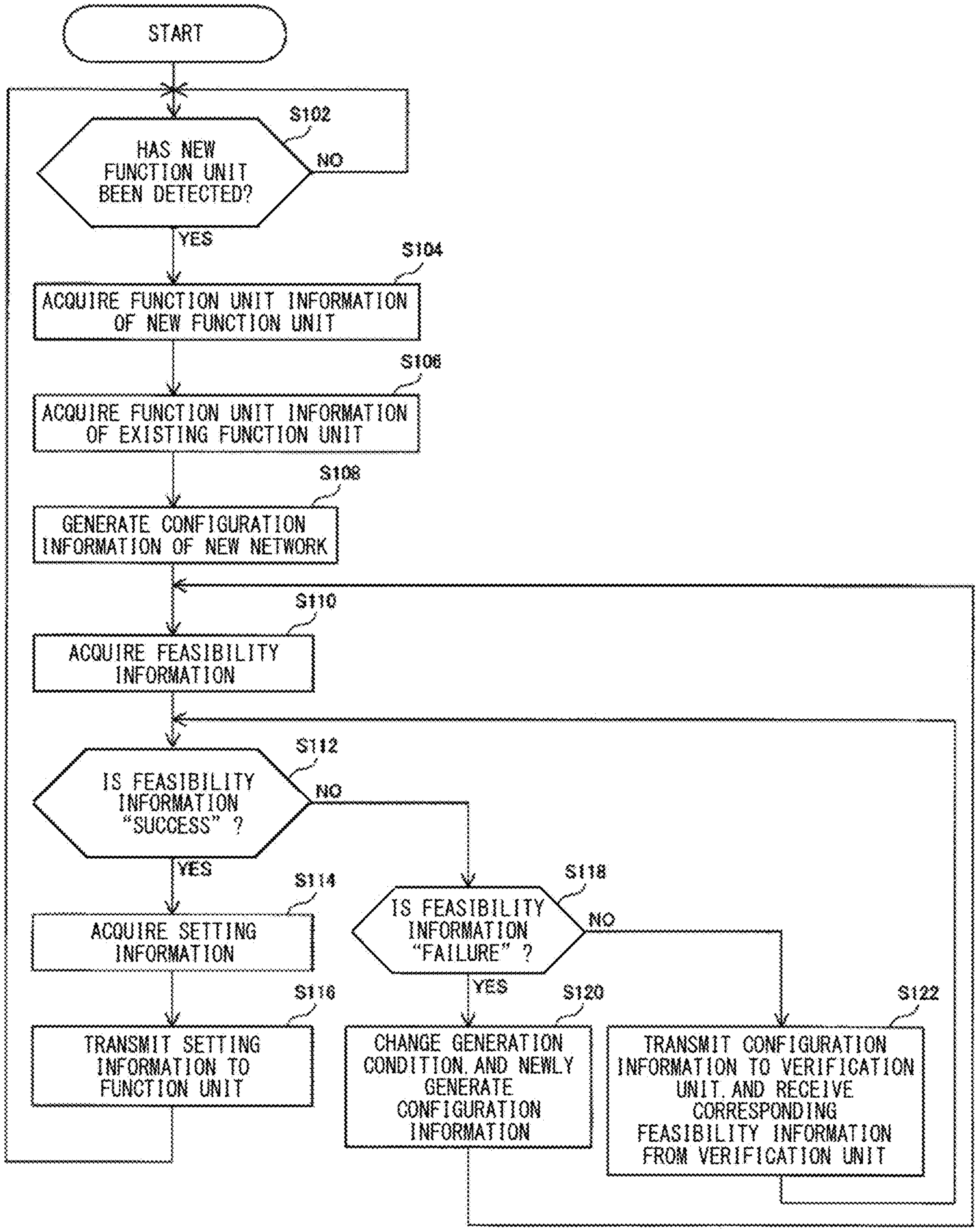
FIG. 12 is a flowchart of an operation procedure when the management unit constructs a new network in the communication system according to the embodiment of the present disclosure.

FIG. 12 is a flowchart of an operation procedure when a management unit constructs a new network in the communication system according to the embodiment of the present disclosure.

With reference to FIG. 12, firstly, the management unit 200 waits for addition of a new function unit to the network 12 (NO in step S102). The management unit 200 detects a new function unit (YES in step S102), and acquires function unit information of the detected new function unit (step S104).

Next, the management unit 200 acquires function unit information of an existing function unit (step S106).

Next, the management unit 200 generates configuration information of a new network, based on the acquired function unit information of the new function unit and the existing function unit (step S108).

Next, the management unit 200 acquires success/failure information corresponding to the generated configuration information, from the success/failure database in the storage device 181 of the server 180 (step S110).

When the acquired success/failure information indicates "success" (YES in step S112), the management unit 200 acquires setting information indicating the setting content for performing communication in the new network, from the setting database in the storage device 181 of the server 180 (step S114).

Next, the management unit 200 transmits the acquired setting information to one or a plurality of function units in the new network (step S116).

Next, the management unit 200 waits for addition of a new function unit to the new network (NO in step S102).

Meanwhile, when the acquired success/failure information indicates "failure" (NO in step S112, and YES in step S118), the management unit 200 changes the generation condition for configuration information, and newly generates configuration information according to the changed generation condition (step S120).

Next, the management unit 200 acquires success/failure information corresponding to the newly generated configuration information, from the success/failure database in the storage device 181 of the server 180 (step S110).

Meanwhile, if such success/failure information is not present in the success/failure database (NO in step S112, and NO in step S118), the management unit 200 transmits the configuration information to the verification unit 184 in the server 180, and receives the corresponding feasibility information from the verification unit 184 (step S122).

When, for example, success/failure information included in the received feasibility information indicates "success" (YES in step S112), the management unit 200 acquires setting information included in the feasibility information (step S114), and transmits the acquired setting information to one or a plurality of function units in the new network (step S116).

Next, the management unit 200 waits for addition of a new function unit to the new network (NO in step S102).

Figure 13:
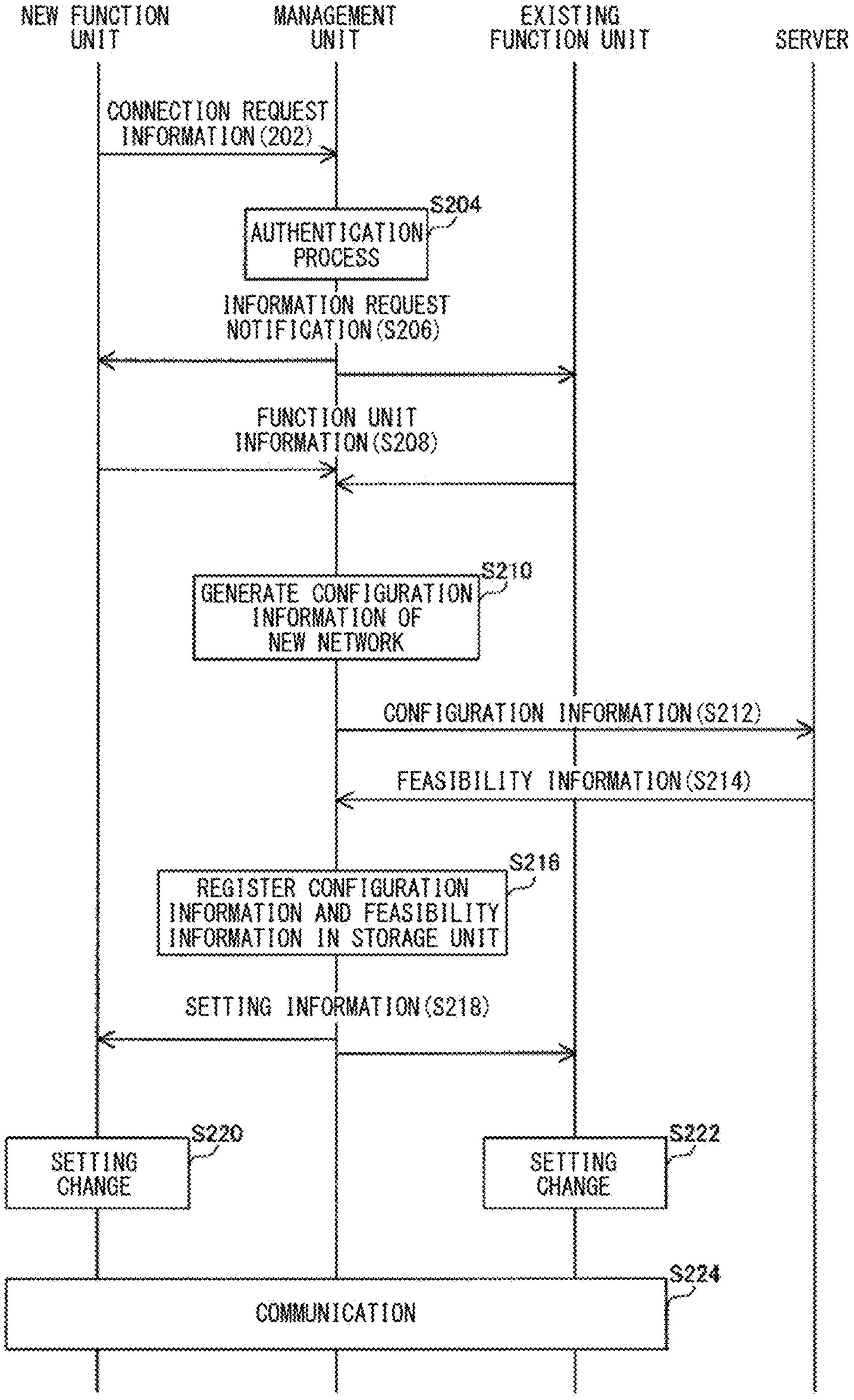
FIG. 13 shows an example of a sequence of a new network construction process in the communication system according to the embodiment of the present disclosure.

FIG. 13 shows an example of a sequence of a new network construction process in the communication system according to the embodiment of the present disclosure.

With reference to FIG. 13, firstly, a new function unit to be newly added to the network 12 transmits connection request information to the management unit 200 (step S202). Upon receiving the connection request information from the new function unit, the management unit 200 detects this new function unit, and subjects the new function unit to an authentication process (step S204).

When the authentication of the new function unit has been successful, the management unit 200 transmits an information request notification for requesting function unit information to the existing function unit and the new function unit (step S206).

Next, the new function unit and the existing function unit each transmit, as a response to the information request notification, its own function unit information of the type designated in the information request notification, to the management unit 200 (step S208).

Next, the management unit 200 generates configuration information of a new network, based on the function unit information received from the existing function unit and the new function unit (step S210).

Next, the management unit 200 transmits the generated configuration information to the server 180 via the wireless base station device 161 (step S212).

Next, the server 180 acquires, from the database, feasibility information that indicates feasibility of the new network and corresponds to the configuration information received from the management unit 200, and transmits the acquired feasibility information to the management unit 200 via the wireless base station device 161 (step S214).

Next, the management unit 200 registers the generated configuration information and the feasibility information received from the server 180, in the storage unit 240 (step S216).

When the feasibility information includes the success/failure information indicating "success" and the setting information, the management unit 200 transmits the setting information to the existing function unit and the new function unit (step S218).

Next, the new function unit performs setting change, based on the setting information received from the management unit 200 (step S220).

Meanwhile, the existing function unit performs setting change, based on the setting information received from the management unit 200 (step S222).

Next, the new function unit and the existing function unit in the new network communicate with each other according to the changed setting content (step S224).

Figure 14:
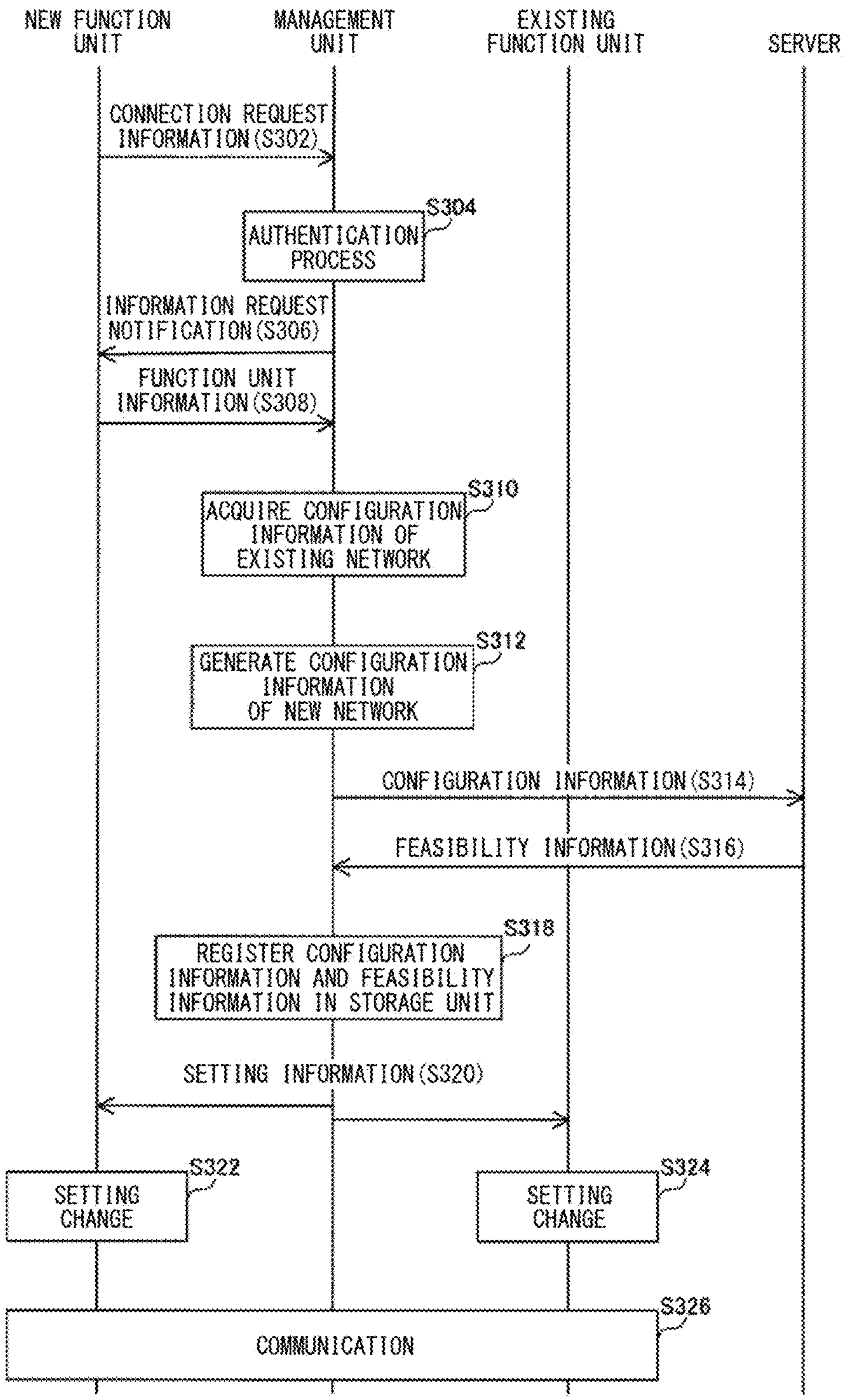
FIG. 14 shows another example of the sequence of the new network construction process in the communication system according to the embodiment of the present disclosure.

FIG. 14 shows another example of the sequence of the new network construction process in the communication system according to the embodiment of the present disclosure.

With reference to FIG. 14, firstly, a new function unit to be newly added to the network 12 transmits connection request information to the management unit 200 (step S302). Upon receiving the connection request information from the new function unit, the management unit 200 detects this new function unit, and subjects the new function unit to an authentication process (step S304).

When the authentication of the new function unit has been successful, the management unit 200 transmits an information request notification for requesting function unit information to the new function unit (step S306).

Next, the new function unit transmits, as a response to the information request notification, its own function unit information of the type designated in the information request notification, to the management unit 200 (step S308).

Next, the management unit 200 acquires configuration information of the existing network from the storage unit 240 (step S310).

Next, the management unit 200 generates configuration information of a new network, based on the function unit information received from the new function unit and the configuration information acquired from the storage unit 240 (step S312).

Next, the management unit 200, the new function unit, the existing function unit, and the server 180 perform the processes from step S314 to step S326 which are similar to the processes from step S212 to step S224 in FIG. 12.

Figure 15:
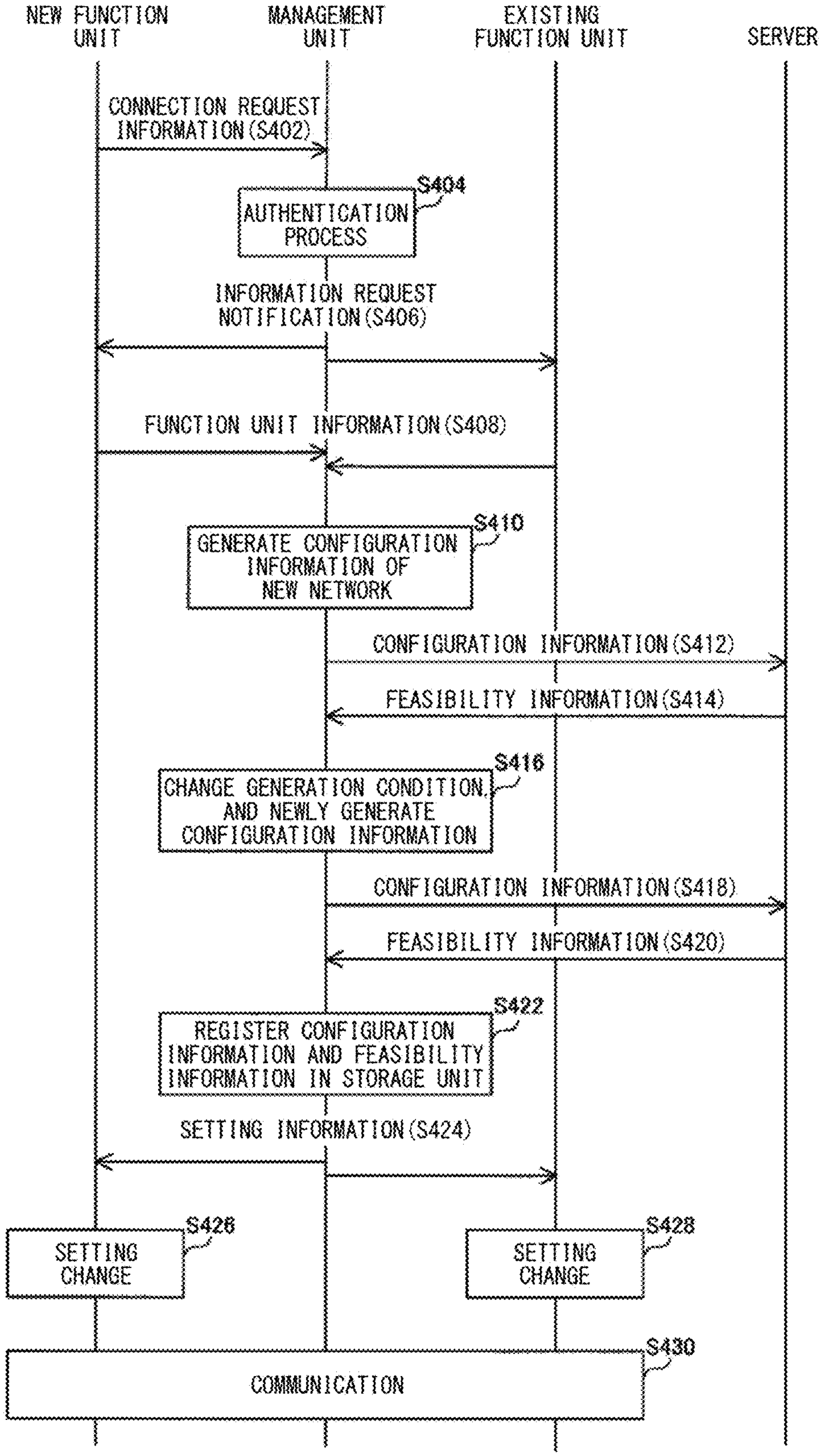
FIG. 15 shows another example of the sequence of the new network construction process in the communication system according to the embodiment of the present disclosure.

FIG. 15 shows another example of the sequence of the new network construction process in the communication system according to the embodiment of the present disclosure.

The processes from step S402 to step S414 in FIG. 15 are similar to the processes from step S202 to step S214 in FIG. 12.

Next to step S414, if the feasibility information includes the success/failure information indicating "failure", the management unit 200 changes the generation condition for configuration information, and newly generates configuration information according to the changed generation condition (step S416).

Next, the management unit 200 transmits the newly generated configuration information to the server 180 via the wireless base station device 161 (step S418).

Next, the server 180 acquires, from the database, feasibility information that indicates feasibility of the new network and corresponds to the configuration information received from the management unit 200, and transmits the acquired feasibility information to the management unit 200 via the wireless base station device 161 (step S420).

Next, the management unit 200, the new function unit, and the existing function unit perform the processes from step S422 to step S430 which are similar to the processes from step S216 to step S224 in FIG. 12.

Figure 16:
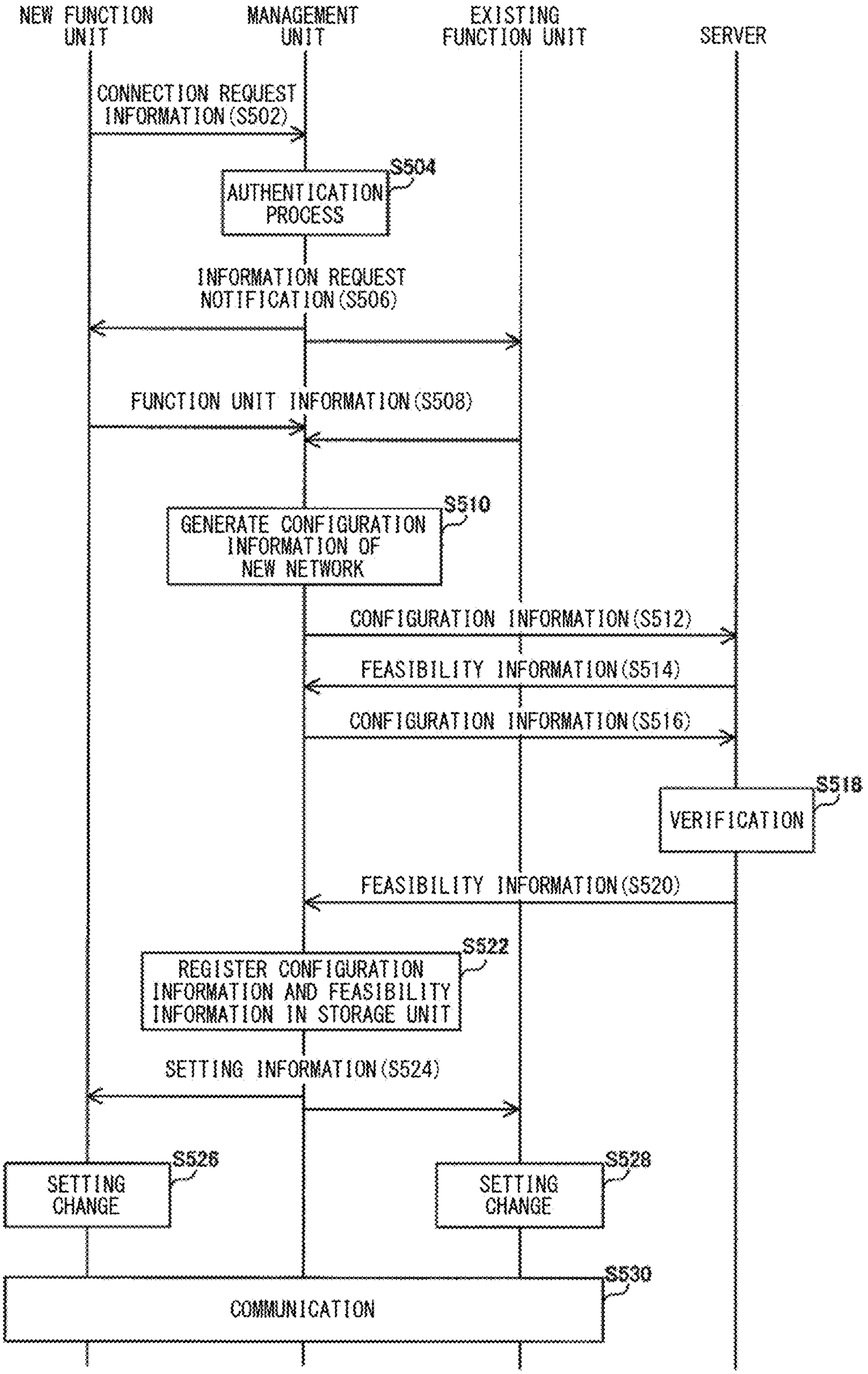
FIG. 16 shows another example of the sequence of the new network construction process in the communication system according to the embodiment of the present disclosure.

FIG. 16 shows another example of the sequence of the new network construction process in the communication system according to the embodiment of the present disclosure.

The processes from step S502 to step S514 in FIG. 16 are similar to the processes from step S202 to step S214 in FIG. 12.

Next to step S514, if such success/failure information is not present in the success/failure database, the management unit 200 transmits the corresponding configuration information to the server 180 via the wireless base station device 161 (step S516).

Next, the server 180 verifies feasibility of the configuration information received from the management unit 200 (step S518).

Next, the server 180 generates feasibility information of the configuration information, and transmits the generated feasibility information, as a verification result, to the management unit 200 via the wireless base station device 161 (step S520).

Next, the management unit 200, the new function unit, and the existing function unit perform the processes from step S522 to step S530 which are similar to the processes from step S216 to step S224 in FIG. 13 or to the processes from step S416 to S430 in FIG. 15.

Figure 17:
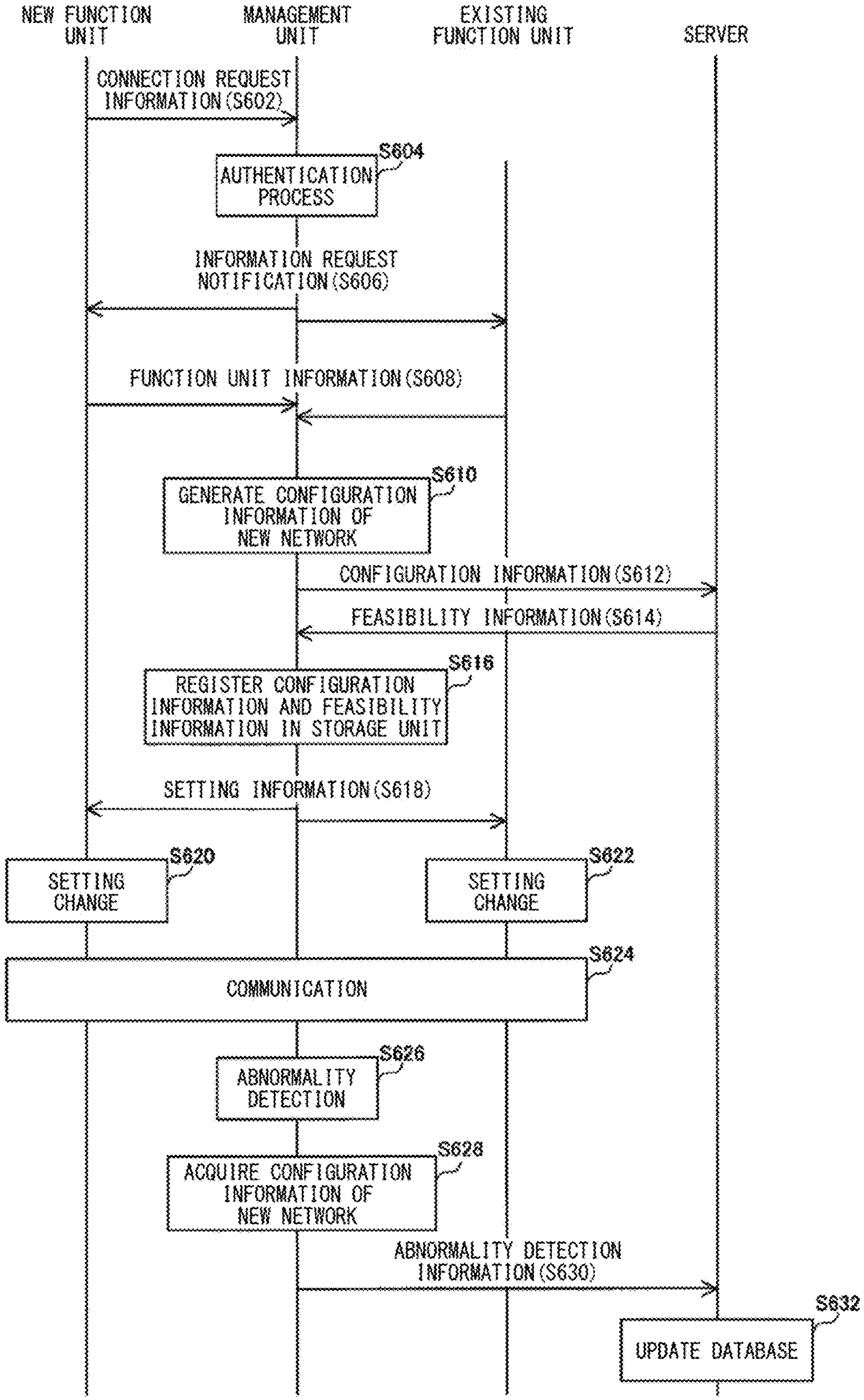
FIG. 17 shows another example of the sequence of the new network construction process in the communication system according to the embodiment of the present disclosure.

FIG. 17 shows another example of the sequence of the new network construction process in the communication system according to the embodiment of the present disclosure.

The processes from step S602 to step S624 in FIG. 17 are similar to the processes from step S202 to step S224 in FIG. 12.

Next to step S624, the management unit 200 detects abnormality that has occurred in the new network (step S626).

Next, the management unit 200 acquires the configuration information of the new network from the storage unit 240 (step S628).

Next, the management unit 200 transmits the acquired configuration information and abnormality detection information indicating the occurrence of the abnormality, to the server 180 via the wireless base station device 161 (step S630).

Next, the server 180 updates the database in the storage device 181, based on the abnormality detection information received from the management unit 200 (step S632).

In the management unit 200 according to the embodiment of the present disclosure, if an on-vehicle ECU 111 or an external device is added to the network 12, the detection unit 210 detects, as a new function unit, an application 100 included in the on-vehicle ECU 111 or the external device. However, the present disclosure is not limited thereto. The detection unit 210 may detect, as a new function unit, an on-vehicle ECU 111 or an external device, to be added to the network 12, in which no application 100 is installed.

In the management unit 200 according to the embodiment of the present disclosure, when the success/failure information in the success/failure database in the storage device 181 indicates "unverified", the acquisition unit 230 transmits the corresponding configuration information to the verification unit 184 in the server 180, and receives the corresponding feasibility information from the verification unit 184. However, the present disclosure is not limited thereto. When the acquisition unit 230 has acquired success/failure information indicating "reverification required" from the success/failure database or when the acquisition unit 230 cannot acquire success/failure information because the configuration information generated by the generation unit 220 is not registered in the success/failure database, the acquisition 230 may transmit the corresponding configuration information to the verification unit 184 in the server 180 and receive the corresponding feasibility information from the verification unit 184.

In the management unit 200 according to the embodiment of the present disclosure, the acquisition unit 230 receives success/failure information and setting information transmitted from the server 180 and outputs these pieces of information to the notification unit 250, and the notification unit 250 transmits the setting information received from the acquisition unit 230 to the respective function units in the new network to cause each function unit to perform setting change. However, the present disclosure is not limited thereto. The server 180 may not necessarily transmit the setting information to the acquisition unit 230. In this case, the management unit 200 may not necessarily include the notification unit 250.

In the management unit 200 according to the embodiment of the present disclosure, when the generation unit 220 receives success/failure information indicating "failure" from the acquisition unit 230, the generation unit 220 changes the generation condition for configuration information, and newly generates configuration information according to the changed generation condition. However, the present disclosure is not limited thereto. Even when receiving the success/failure information indicating "failure", the generation unit 220 may not necessarily newly generate configuration information. In this case, for example, the notification unit 250 notifies the new function unit that the new function unit is not added to the network 12.

In the management unit 200 according to the embodiment of the present disclosure, when the generation unit 220 has acquired configuration information of an existing network from the storage unit 240, the generation unit 220 generates configuration information of a new network, based on function unit information of a new function unit and on the acquired configuration information of the existing network. However, the present disclosure is not limited thereto. Even when acquiring the configuration information of the existing network from the storage unit 240, the generation unit 220 may acquire function unit information from one or a plurality of existing function units, according to the content of the function unit information of the new function unit, and may generate configuration information of a new network, based on the function unit information of the new function unit, the function unit information of the existing function unit, and the acquired configuration information of the existing network.

In the management unit 200 according to the embodiment of the present disclosure, the notification unit 250 specifies a function unit whose setting content needs to be changed, among a new function unit and one or a plurality of existing function units included in an existing network, and notifies the specified function unit of the setting content. However, the present disclosure is not limited thereto. The notification unit 250 may not necessarily specify a function unit whose setting content needs to be changed, and may notify all the function units in the new network of the setting content.

In the communication system 400 according to the embodiment of the present disclosure, the management unit 200 is included in the relay device 112 in the network 12. However, the present disclosure is not limited thereto. Some or all of the units in the management unit 200 may be included in a device other than the relay device 112 in the network 12, or may be placed outside the network 12. For example, if the management unit 200 is included in a relay device 112 in a star-type topology network as shown in FIG. 2, the management unit 200 can perform the above-described processes more efficiently.

The management unit 200 may be implemented by the server 180. In this case, a part or the entirety of the functions of the management unit 200 according to the embodiment of the present disclosure may be provided by cloud computing. That is, the management unit 200 according to the embodiment of the present disclosure may be implemented by a plurality of cloud servers or the like.

In the communication system 400 according to the embodiment of the present disclosure, if abnormality occurs in a new network, the notification unit 250 in the management unit 200 transmits abnormality detection information to the update unit 183 in the server 180, and the update unit 183 in the server 180 updates the database, based on the abnormality detection information received from the notification unit 250. However, the present disclosure is not limited thereto. The notification unit 250 may not necessarily transmit the abnormality detection information to the update unit 183. In this case, the management unit 200 may not necessarily include the abnormality detection unit 260.

Meanwhile, a technology capable of flexibly constructing a network of a new configuration while maintaining a stable operation in the network, has been demanded.

For example, when constructing a new network by newly adding a function unit to a network, there are cases where communication required by an upper layer cannot be realized due to the network configuration and restriction of a lower layer.

As an example of the network configuration and restriction of the lower layer, there is restriction on a communication band of a physical layer. In particular, a network for which cost reduction is required, such as a network including an on-vehicle function unit such as an on-vehicle ECU, is subjected to the restriction on the communication band as described above. Therefore, it is sometimes difficult to add a new function unit to the network while maintaining the stable operation in the network.

In contrast to the above case, in the relay device 112 according to the embodiment of the present disclosure, the detection unit 210 detects addition of a function unit to a network including one or a plurality of on-vehicle function units. The generation unit 220 acquires function unit information of a new function unit that is the function unit the addition of which has been detected by the detection unit 210, and function unit information of the on-vehicle function unit, and generates, based on the respective pieces of function unit information acquired, configuration information of a new network that is the network 12 in which the new function unit is further included. The acquisition unit 230 acquires, from the database in the storage device 181, feasibility information indicating feasibility of the new network and corresponding to the configuration information generated by the generation unit 220.

As described above, since the configuration information of the new network including the detected new function unit is generated and the feasibility information indicating the feasibility of the new network is acquired from the database, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which will be caused by addition of a new function unit to the network.

Therefore, in the relay device 112 according to the embodiment of the present disclosure, it is possible to flexibly construct a network of a new configuration while maintaining the stable operation in the network.

In the relay device 112 according to the embodiment of the present disclosure, the notification unit 250, based on the feasibility information acquired by the acquisition unit 230, notifies at least one of the new function unit constructing the new network and the one or the plurality of on-vehicle function units, of the setting content for performing communication in the new network.

With this configuration, the setting content of each function unit can be changed to an appropriate content according to specifications (e.g., topology) related to communication in the new network.

In the relay device 112 according to the embodiment of the present disclosure, the notification unit 250 specifies, from among the new function unit and one or a plurality of function units included in the network 12 before the new function unit is added thereto, a function unit whose setting content needs to be changed for performing communication in the new network, and notifies the specified function unit of the setting content.

With this configuration, for example, notification of the setting content to a function unit whose setting content need not be changed can be omitted while a function unit whose setting content needs to be changed is notified of the setting content. Therefore, it is possible to inhibit unnecessary communication between the relay device 112 and the function units.

In the relay device 112 according to the embodiment of the present disclosure, the generation unit 220 changes a generation condition, based on the feasibility information acquired by the acquisition unit 230, and newly generates the configuration information according to the changed generation condition.

With this configuration, if it is difficult to successfully construct a new network, for example, configuration information of a new network, in which the additional content of a new function unit to the network is changed, is newly generated, and feasibility information of the changed new network can be acquired. Thus, more flexible construction of a new network can be realized.

In the relay device 112 according to the embodiment of the present disclosure, the storage unit 240 stores therein the configuration information generated by the generation unit 220, and the feasibility information corresponding to the configuration information.

With this configuration, when a new network is constructed by adding a new function unit to an existing network, configuration information of the existing network can be acquired from the storage unit, thereby simplifying the network construction process.

The vehicle 1 according to the embodiment of the present disclosure includes the relay device 112.

With this configuration, in the vehicle 1 including the relay device 112, a network of a new configuration can be flexibly constructed while maintaining the stable operation in the network.

The communication system 400 according to the embodiment of the present disclosure includes the relay device 112, and one or a plurality of on-vehicle function units constructing a network. The relay device 112 detects addition of a function unit to the network 12, and acquires function unit information from a new function unit that is the function unit the addition of which has been detected. The one or the plurality of on-vehicle function units transmit function unit information thereof to the relay device 112. Based on the function unit information acquired from the new function unit and on the function unit information received from the one or the plurality of on-vehicle function units, the relay device 112 generates configuration information of a new network that is the network 12 in which the new function unit is further included. The relay device 112 acquires, from the database in the storage device 181, feasibility information indicating feasibility of the new network and corresponding to the generated configuration information.

As described above, since the configuration information of the new network including the detected new function unit is generated and the feasibility information indicating the feasibility of the new network is acquired from the database, it is possible to construct the new network by using a verification result of the feasibility of the network having been verified in advance. Thus, it is possible to construct, as a new network, a network whose feasibility has been ensured while considering the logical configuration and the physical configuration thereof, for example. Therefore, it is possible to inhibit occurrence of a communication delay which will be caused by addition of a new function unit to the network.

Therefore, in the communication system 400 according to the embodiment of the present disclosure, it is possible to flexibly construct a network of a new configuration while maintaining the stable operation in the network.

In the communication system 400 according to the embodiment of the present disclosure, the update unit 183 updates the database in the storage device 181.

With this configuration, a new combination of configuration information and feasibility information of a network can be registered in the database, whereby a variety of networks can be constructed.

In the communication system 400 according to the embodiment of the present disclosure, when the relay device 112 has detected abnormality in the new network, the relay device 112 transmits, to the update unit 183, abnormality detection information indicating the configuration information of the new network and the occurrence of the abnormality. The update unit 183 updates the database, based on the abnormality detection information received from the relay device 112.

With this configuration, occurrence of abnormality in the new network can be reflected in the database, whereby a more stable new network can be constructed by using the updated database.

In the communication system 400 according to the embodiment of the present disclosure, the verification unit 184 verifies the feasibility of the configuration information generated by the relay device 112, when the feasibility information corresponding to the configuration information generated by the relay device 112 is not present in the database. With this configuration, if the feasibility of the new network has not been verified in advance, feasibility information of the new network can be acquired by new verification to attempt construction of the new network.

A vehicle communication management method according to the embodiment of the present disclosure is a method performed by the relay device 112. In the vehicle communication management method, firstly, the relay device 112 detects addition of a function unit to the network 12 including one or a plurality of on-vehicle function units. Next, the relay device 112 acquires function unit information of a new function unit that is the function unit the addition of which has been detected, and function unit information of the on-vehicle function unit, and generates, based on the respective pieces of function unit information acquired, configuration information of a new network that is the network 12 in which the new function unit is further included. Next, the relay device 112 acquires, from the database in the storage device 181, feasibility information indicating feasibility of the new network and corresponding to the generated configuration information.

As described above, since the configuration information of the new network including the detected new function unit is generated and the feasibility information indicating the feasibility of the new network is acquired from the database, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which will be caused by addition of a new function unit to the network.

Therefore, in the vehicle communication management method according to the embodiment of the present disclosure, it is possible to flexibly construct a network of a new configuration while maintaining the stable operation in the network.

A vehicle communication management method according to the embodiment of the present disclosure is a method performed by the vehicle communication system 300 that includes the relay device 112, and one or a plurality of on-vehicle function units constructing the network 12. In this vehicle communication management method, firstly, the relay device 112 detects addition of a function unit to the network 12, and acquires function unit information from a new function unit that is the function unit the addition of which has been detected. Next, the one or the plurality of on-vehicle function units transmit function unit information thereof to the relay device 112. Next, the relay device 112 generates configuration information of a new network that is the network 12 in which the new function unit is further included, based on the function unit information acquired from the new function unit and on the function unit information received from the one or the plurality of on-vehicle function units. Next, the relay device 112 acquires, from the database in the storage device 181, feasibility information indicating feasibility of the new network and corresponding to the generated configuration information.

As described above, since the configuration information of the new network including the detected new function unit is generated and the feasibility information indicating the feasibility of the new network is acquired from the database, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which will be caused by addition of a new function unit to the network.

Therefore, in the vehicle communication management method according to the embodiment of the present disclosure, it is possible to flexibly construct a network of a new configuration while maintaining the stable operation in the network.

The above-described embodiment is illustrative in all aspects and should be considered not restrictive. The scope of the present invention is not limited by the configuration of the above-described embodiment but is defined by the claims, and is intended to include meaning equivalent to the scope of the claims and all modifications within the scope.

The above description includes the features in the additional notes below.

[Additional Note 1]

A management device comprising:

a detection unit configured to detect a new function unit that is a function unit to be newly added to a network including one or a plurality of on-vehicle function units;

a generation unit configured to acquire function unit information of the new function unit detected by the detection unit and function unit information of the on-vehicle function unit, and configured to generate, based on the respective pieces of function unit information acquired, configuration information of a new network that is the network in which the new function unit is further included; and an acquisition unit configured to acquire, from a database in a storage device, feasibility information indicating feasibility of the new network, the feasibility information being acquired by using, as a search key, the configuration information generated by the generation unit, wherein the acquisition unit acquires the feasibility information corresponding to the configuration information generated by the generation unit, from the database storing therein a plurality of pieces of feasibility information generated through verification in advance while considering logical configurations and physical configurations of a plurality of networks.

[Additional Note 2]

A communication system comprising:

a management device;

one or a plurality of on-vehicle function units constructing a network; and a new function unit that is a function unit to be newly added to the network, wherein the management device detects addition of the new function unit to the network, the new function unit and the one or the plurality of on-vehicle function units transmit function unit information thereof to the management device, based on the function unit information received from the new function unit and the one or the plurality of on-vehicle function units, the management device generates configuration information of a new network that is the network in which the new function unit is further included, the management device acquires, from a database in a storage device, feasibility information indicating feasibility of the new network, the feasibility information being acquired by using the generated configuration information as a search key, and the management device acquires the feasibility information corresponding to the configuration information generated by the generation unit, from the database storing therein a plurality of pieces of feasibility information generated through verification in advance while considering logical configurations and physical configurations of a plurality of networks.

[Additional Note 3]

A management device including a processor, the processor implementing:

a detection unit configured to detect a new ECU that is a function unit to be newly added to a network including one or a plurality of on-vehicle ECUs;

a generation unit configured to acquire function unit information of the new ECU detected by the detection unit and function unit information of the on-vehicle ECU, and configured to generate, based on the respective pieces of function unit information acquired, configuration information of a new network that is the network in which the new ECU is further included; and an acquisition unit configured to acquire, from a database in a storage device, feasibility information indicating feasibility of the new network and corresponding to the configuration information generated by the generation unit.

[Additional Note 4]

A communication system comprising:

a management device;

one or a plurality of on-vehicle ECUs constructing a network; and a new ECU that is a function unit to be newly added to the network, wherein the management device detects addition of the new ECU to the network, the new ECU and the one or the plurality of on-vehicle ECUs transmit function unit information thereof to the management device, based on the function unit information received from the new ECU and the one or the plurality of on-vehicle ECUs, the management device generates configuration information of a new network that is the network in which the new ECU is further included, and the management device acquires, from a database in a storage device, feasibility information indicating feasibility of the new network and corresponding to the generated configuration information.

REFERENCE SIGNS LIST

1 vehicle
10 VLAN
11 Ethernet cable
12 network
20 VLAN
30 VLAN
100 application
111 on-vehicle ECU
112 relay device
113 external device
161 wireless base station device
170 external network
180 server
181 storage device
182 database processing unit
183 update unit
184 verification unit
200 management unit
210 detection unit
220 generation unit
230 acquisition unit
240 storage unit
250 notification unit
260 abnormality detection unit
300 vehicle communication system
400 communication system

The invention claimed is:

1. A management device comprising:

a detection unit configured to detect addition of a function unit to a network including one or a plurality of on-vehicle function units;

a generation unit configured to acquire function unit information of a new function unit that is the function unit the addition of which has been detected by the detection unit, and function unit information of the on-vehicle function unit, and configured to generate, based on the respective pieces of function unit information acquired, configuration information of a new network that is the network in which the new function unit is further included; and an acquisition unit configured to acquire, from a database in a storage device, feasibility information indicating feasibility of the new network and corresponding to the configuration information generated by the generation unit, wherein when the feasibility information corresponding to the configuration information generated by the generation unit is not present in the database, the acquisition unit transmits the configuration information generated by the generation unit in order to verify the feasibility of the configuration information.

2. The management device according to claim 1, further comprising a notification unit configured to, based on the feasibility information acquired by the acquisition unit, notify at least one of the new function unit and the one or the plurality of on-vehicle function units which construct the new network, of a setting content for performing communication in the new network.

3. The management device according to claim 2, wherein
the notification unit specifies, from among the new function unit and one or a plurality of function units included in the network before the addition of the new function unit, a function unit whose setting content needs to be changed for performing communication in the new network, and notifies the specified function unit of the setting content.

4. The management device according to claim 1, wherein
the generation unit changes a generation condition, based on the feasibility information acquired by the acquisition unit, and newly generates the configuration information according to the changed generation condition.

5. The management device according to claim 1, further comprising a storage unit configured to store therein the configuration information generated by the generation unit, and the feasibility information corresponding to the configuration information.

6. A communication system comprising:
a management device; and
one or a plurality of on-vehicle function units constructing a network, wherein
the management device detects addition of a function unit to the network, and acquires function unit information from a new function unit that is the function unit the addition of which has been detected,
the one or the plurality of on-vehicle function units transmit function unit information thereof to the management device,
based on the function unit information acquired from the new function unit and on the function unit information received from the one or the plurality of on-vehicle function units, the management device generates configuration information of a new network that is the network in which the new function unit is further included, and
the management device acquires, from a database in a storage device, feasibility information indicating feasibility of the new network and corresponding to the generated configuration information, wherein
the communication system comprises a verification unit configured to verify the feasibility of the configuration information generated by the management device, when the feasibility information corresponding to the configuration information generated by the management device is not present in the database.

7. The communication system according to claim 6, further comprising an update unit configured to update the database in the storage device.

8. The communication system according to claim 7, wherein
when the management device has detected abnormality in the new network, the management device transmits, to the update unit, abnormality detection information indicating the occurrence of the abnormality in the new network, and
the update unit updates the database, based on the abnormality detection information received from the management device.

9. A vehicle communication management method performed by a management device, comprising:
detecting addition of a function unit to a network including one or a plurality of on-vehicle function units;
acquiring function unit information of a new function unit that is the function unit the addition of which has been detected, and function unit information of the on-vehicle function unit, and generating, based on the respective pieces of function unit information acquired, configuration information of a new network that is the network in which the new function unit is further included;
acquiring, from a database in a storage device, feasibility information indicating feasibility of the new network and corresponding to the generated configuration information; and
when the feasibility information corresponding to the generated configuration information is not present in the database, transmitting the units generated configuration information in order to verify the feasibility of the configuration information.

10. A non-transitory computer readable storage medium storing a vehicle communication management program used in a management device, the program causing a computer to function as:
a detection unit configured to detect addition of a function unit to a network including one or a plurality of on-vehicle function units;
a generation unit configured to acquire function unit information of a new function unit that is the function unit the addition of which has been detected by the detection unit, and function unit information of the on-vehicle function unit, and configured to generate, based on the respective pieces of function unit information acquired, configuration information of a new network that is the network in which the new function unit is further included; and
an acquisition unit configured to acquire, from a database in a storage device, feasibility information indicating feasibility of the new network and corresponding to the configuration information generated by the generation unit, wherein
when the feasibility information corresponding to the configuration information generated by the generation unit is not present in the database, the acquisition unit transmits the configuration information generated by the generation unit in order to verify the feasibility of the configuration information.

11. The management device according to claim 1, wherein
the acquisition unit acquires, from the database, the feasibility information generated based on a result of verification performed in advance while considering a logical configuration and a physical configuration of the new network.

12. The management device according to claim 1, wherein
the function unit information includes at least one of information regarding topologies of hardware devices in the new network, information regarding allocation of applications to the hardware devices in the new network, and information regarding restriction on a communication method between the applications of the hardware devices.

13. The communication system according to claim 6, wherein
the management device acquires, from the database, the feasibility information generated based on a result of verification performed in advance while considering a logical configuration and a physical configuration of the new network.

14. The communication system according to claim 6, wherein the function unit information includes at least one of information regarding topologies of hardware devices in the new network, information regarding allocation of applications to the hardware devices in the new network, and information regarding restriction on a communication method between the applications of the hardware devices.

* * * * *